(12) United States Patent
Whitacre et al.

(10) Patent No.: US 8,945,756 B2
(45) Date of Patent: Feb. 3, 2015

(54) COMPOSITE ANODE STRUCTURE FOR AQUEOUS ELECTROLYTE ENERGY STORAGE AND DEVICE CONTAINING SAME

(71) Applicant: Aquion Energy Inc., Pittsburgh, PA (US)

(72) Inventors: Jay Whitacre, Pittsburgh, PA (US); Alex Mohamed, Pittsburgh, PA (US); Andrew Polonsky, Pittsburgh, PA (US); Sneha Shanbhag, Pittsburgh, PA (US); Kristen Carlisle, Pittsburgh, PA (US)

(73) Assignee: Aquion Energy Inc., Pittsburgh, PA (US)

( * ) Notice: Subject to any disclaimer, the term of this patent is extended or adjusted under 35 U.S.C. 154(b) by 0 days.

(21) Appl. No.: 13/972,409

(22) Filed: Aug. 21, 2013

(65) Prior Publication Data

US 2014/0159668 A1 Jun. 12, 2014

Related U.S. Application Data

(60) Provisional application No. 61/736,137, filed on Dec. 12, 2012.

(51) Int. Cl.
*H01M 4/36* (2006.01)
*H01G 11/06* (2013.01)
(Continued)

(52) U.S. Cl.
CPC .............. *H01M 4/364* (2013.01); *H01G 11/06* (2013.01); *H01M 12/005* (2013.01);
(Continued)

(58) Field of Classification Search
CPC ......... H01M 4/96; H01M 8/188; H01M 4/02; H01M 2300/0014; H01M 85/184; H01M 11/30; H01M 11/54; H01M 4/13; H01M 4/587

USPC ........... 320/130, 128; 252/507; 429/158, 188, 429/206, 231.5, 347
See application file for complete search history.

(56) References Cited

U.S. PATENT DOCUMENTS 4,144,381 A 3/1979 Fatica
4,246,253 A 1/1981 Hunter
(Continued)

FOREIGN PATENT DOCUMENTS

CN 101154745 A 4/2008
CN 101154745 A 4/2008
(Continued)

OTHER PUBLICATIONS

Palomares, V., et al.; "Na-ion batteries, recent advances and present challenges to become low cost energy storage systems", Energy and Environmental Science, vol. 5, pp. 5884-5901 (2012).
(Continued)

*Primary Examiner* — Mark F Huff
*Assistant Examiner* — Monique Wills
(74) *Attorney, Agent, or Firm* — The Marbury Law Group PLLC

(57) ABSTRACT

An anode electrode for an energy storage device includes both an ion intercalation material and a pseudocapacitive material. The ion intercalation material may be a NASICON material, such as $NaTi_2(PO_4)_3$ and the pseudocapacitive material may be an activated carbon material. The energy storage device also includes a cathode, an electrolyte and a separator.

20 Claims, 12 Drawing Sheets

(51) Int. Cl.
| | |
|---|---|
| *H01M 12/00* | (2006.01) |
| *H01M 4/58* | (2010.01) |
| *H01G 11/50* | (2013.01) |
| *H01M 4/587* | (2010.01) |
| *H01M 10/44* | (2006.01) |
| *H01G 11/62* | (2013.01) |

(52) U.S. Cl.
CPC ............ *H01M 4/5825* (2013.01); *H01G 11/50* (2013.01); *H01M 4/587* (2013.01); *H01M 10/44* (2013.01); *H01G 11/62* (2013.01)
USPC .......................................... 429/158; 320/130

(56) References Cited

U.S. PATENT DOCUMENTS

| | | | |
|---|---|---|---|
| 4,343,868 | A | 8/1982 | Putt |
| 4,529,676 | A | 7/1985 | Galloway et al. |
| 4,540,639 | A | 9/1985 | Grimes |
| 4,623,597 | A | 11/1986 | Sapru et al. |
| 4,849,309 | A | 7/1989 | Redey et al. |
| 5,316,877 | A | 5/1994 | Thackeray et al. |
| 5,419,977 | A | 5/1995 | Weiss et al. |
| 5,424,145 | A | 6/1995 | Tomantschger et al. |
| 5,525,442 | A | 6/1996 | Shuster |
| 5,558,961 | A | 9/1996 | Doeff et al. |
| 5,858,573 | A | 1/1999 | Abraham et al. |
| 5,882,812 | A | 3/1999 | Visco et al. |
| 5,910,382 | A | 6/1999 | Goodenough et al. |
| 5,958,624 | A | 9/1999 | Frech et al. |
| 5,963,417 | A | 10/1999 | Anderson et al. |
| 6,017,654 | A | 1/2000 | Kumta et al. |
| 6,040,089 | A | 3/2000 | Manev et al. |
| 6,159,637 | A | 12/2000 | Shizuka et al. |
| 6,248,477 | B1 | 6/2001 | Howard, Jr. et al. |
| 6,252,762 | B1 | 6/2001 | Amatucci |
| 6,267,943 | B1 | 7/2001 | Manev et al. |
| 6,322,744 | B1 | 11/2001 | Kelley et al. |
| 6,325,988 | B1 | 12/2001 | Inoue et al. |
| 6,383,683 | B1 | 5/2002 | Nagayama et al. |
| 6,413,673 | B1 | 7/2002 | Kasai et al. |
| 6,423,294 | B2 | 7/2002 | Manev et al. |
| 6,455,187 | B1 | 9/2002 | Tomazic |
| 6,461,495 | B1 | 10/2002 | Morrissey et al. |
| 6,465,129 | B1 | 10/2002 | Xu et al. |
| 6,465,130 | B1 | 10/2002 | Numata et al. |
| 6,517,972 | B1 | 2/2003 | Amatucci |
| 6,531,220 | B1 | 3/2003 | Kweon et al. |
| 6,599,662 | B1 | 7/2003 | Chiang et al. |
| 6,670,076 | B1 | 12/2003 | Iwata et al. |
| 6,673,491 | B2 | 1/2004 | Shirakawa et al. |
| 6,692,665 | B2 | 2/2004 | Shima et al. |
| 6,759,165 | B2 | 7/2004 | Tsuruta et al. |
| 6,787,232 | B1 | 9/2004 | Chiang et al. |
| 6,814,894 | B2 | 11/2004 | Shoji et al. |
| 6,824,923 | B2 | 11/2004 | Che et al. |
| 6,869,547 | B2 | 3/2005 | Barker et al. |
| 6,872,492 | B2 | 3/2005 | Barker et al. |
| 7,008,726 | B2 | 3/2006 | Adamson et al. |
| 7,041,239 | B2 | 5/2006 | Barker et al. |
| 7,056,486 | B2 | 6/2006 | Park et al. |
| 7,087,346 | B2 | 8/2006 | Barker et al. |
| 7,199,997 | B1 | 4/2007 | Lipka et al. |
| 7,214,448 | B2 | 5/2007 | Barker et al. |
| 7,335,444 | B2 | 2/2008 | Numata et al. |
| 7,713,505 | B2 | 5/2010 | Herbst |
| 7,782,740 | B2 | 8/2010 | Amine et al. |
| 8,003,260 | B2 | 8/2011 | Exnar et al. |
| 8,129,052 | B2 | 3/2012 | Visco et al. |
| 8,137,830 | B2 | 3/2012 | Whitacre |
| 8,298,701 | B2 | 10/2012 | Whitacre et al. |
| 2002/0009645 | A1 | 1/2002 | Shima et al. |
| 2002/0048706 | A1 | 4/2002 | Mayes et al. |
| 2002/0182502 | A1 | 12/2002 | Park et al. |
| 2002/0192553 | A1 | 12/2002 | Barker et al. |
| 2003/0035999 | A1 | 2/2003 | Gao et al. |
| 2003/0186128 | A1 | 10/2003 | Singh et al. |
| 2003/0190528 | A1 | 10/2003 | Saidi et al. |
| 2004/0191627 | A1 | 9/2004 | Takahashi et al. |
| 2004/0262571 | A1 | 12/2004 | Barker et al. |
| 2005/0031921 | A1 | 2/2005 | Ovshinsky et al. |
| 2005/0181280 | A1 | 8/2005 | Ceder et al. |
| 2005/0181283 | A1 | 8/2005 | Pugh et al. |
| 2005/0238961 | A1 | 10/2005 | Barker et al. |
| 2006/0019166 | A1 | 1/2006 | Numata et al. |
| 2006/0035151 | A1 | 2/2006 | Kumeuchi et al. |
| 2006/0154071 | A1 | 7/2006 | Homma et al. |
| 2006/0263688 | A1 | 11/2006 | Guyomard et al. |
| 2007/0072034 | A1 | 3/2007 | Barker et al. |
| 2008/0008937 | A1 | 1/2008 | Eylem et al. |
| 2008/0158778 | A1 | 7/2008 | Lipka et al. |
| 2008/0213674 | A1 | 9/2008 | Okada et al. |
| 2009/0053613 | A1 | 2/2009 | Inoue et al. |
| 2009/0253025 | A1 | 10/2009 | Whitacre |
| 2011/0052945 | A1 | 3/2011 | Whitacre |
| 2011/0086276 | A1 | 4/2011 | Kondo |
| 2012/0164499 | A1* | 6/2012 | Chiang et al. ................. 429/81 |
| 2012/0270102 | A1 | 10/2012 | Whitacre et al. |
| 2012/0315540 | A1* | 12/2012 | Hosoe et al. ................. 429/211 |
| 2013/0020999 | A1 | 1/2013 | Whitacre |
| 2013/0059185 | A1 | 3/2013 | Whitacre et al. |

FOREIGN PATENT DOCUMENTS

| | | |
|---|---|---|
| JP | 2000-331682 A | 11/2000 |
| JP | 2003-086179 A | 3/2003 |
| KR | 10-2001-0024357 A | 3/2001 |
| KR | 10-2007-0100918 A | 10/2007 |
| WO | WO 2006/111079 A1 | 10/2006 |
| WO | WO 2011/153330 A1 | 12/2011 |
| WO | WO 2012/074622 A1 | 6/2012 |

OTHER PUBLICATIONS

International Search Report and Written opinion received in connection with international application No. PCT/US2013/073505; dtd Mar. 21, 2014.

Wang et al., "Electrochemical Properties of $TiP_2O_7$ and $LiTi_2(PO_4)_3$ as Anode Material for Lithium Ion Battery with Aqueous Solution Electrolyte," Electrochimica Acta 52 (2007) 3280-3285.

Akimoto et al., "Synthesis and Electrochemical Properties of $Li_{0.44}MnO_2$ as a Novel 4 V Cathode Material," Electrochemical and Solid-State Letters, 2005, 8(10):A554-A557.

Alcantara et al., "Carbon Microspheres Obtained from Resorcinol-Formaldehyde as High-Capacity Electrodes for Sodium-Ion Batteries," Electrochemical and Solid-State Letters, 2005, 8(4):A222-A225.

Alcantara et al., "$NiCo_2O_4$ Spinel: First Report on a Transition Metal Oxide for the Negative Electrode of Sodium-Ion Batteries," Chem. Mater., 2002, 14:2847-2848.

Athouel et al., "Birnessite as Possible Candidate for Hybrid Carbon/$MnO_2$ Electrochemical Capacitor," Abstract from 214th ECS Meeting, Honolulu, HI, Oct. 12-17, 2008.

Bordet-Le Geunne et al., "Structural study of two layered phases in the $Na_xMn_yO_2$ system. Electrochemical behavior of their lithium substituted derivatives," J. Mater. Chem., 2000, 10:2201-2206.

Brousse et al., "A Hybrid Activated Carbon-Manganese Dioxide Capacitor using a Mild Aqueous Electrolyte," Journal of the Electrochemical Society, 2004, 151(4):A614-A622.

Brousse et al., "Crystalline $MnO_2$ Possible Alternatives to Amorphous Compounds in Electrochemical Supercapacitors," Journal of Electrochemical Society, 2006: 153, A2171-A2080.

Cvjeticanin et al., "Cyclic voltammetry of $LiCr_{0.15}Mn_{1.85}O_4$ in an aqueous $LiNO_3$ solution," Journal of Power Sources, 2007, 174:1117-1120.

Doeff et al., "A High-Rate Manganese Oxide for Rechargeable Lithium Battery Applications," Journal of the Electrochemical Society, 2001, 148(3):A230-A236.

Doeff et al., "Electrochemical and structural characterization of titanium-substituted manganese oxides based on $Na_{0.44}MnO_2$," Journal of Power Sources, 2004, 125:240-248.

(56) References Cited

OTHER PUBLICATIONS

Doeff et al., "Lithium Insertion Processes of Orthorhombic $Na_x$ $MnO_2$ -Based Electrode Materials," J. Electrochem. Soc., Aug. 1996, 143(8):2507-2516.

Doeff et al., "Synthesis and characterization of a copper-substituted manganese oxide with the $Na_{0.44}$ $MnO_2$ structure," Journal of Power Sources, 20002, 112:294-297.

Doeff et al., "Orthorhomic $Na_x$ $MnO_2$ as a Cathode Material for Secondary Sodium and Lithium Polymer Batteries," J. Electrochem Soc. vol. 141, No. 11, Nov. 1994.

Eftekhari et al., "Effect of Na diffusion on the formation of fibrous microcrystals of manganese oxide," Materials Research Bulletin, 2005, 40:2205-2211.

Feng et al., "Hydrothermal Soft Chemical Synthesis of Tunnel Manganese Oxides with $Na^+$ as Template," Chemistry Letters, 2000:284-285.

Huang et al., "Kinetics of Electrode Processes of $LiFePO_4$ in Saturated Lithium Nitrate Solution," Acta Phys.-Chim. Sin., 2007, 23(1):129-133.

Imanishi et al., "Study of Electrochemical Sodium Deintercalation of a $Na_x$ $FeO_2$," Denki Kagaku, 1993, 61 (12): 1451-1452.

PCT/US2009/039436, International Search Report & Written Opinion, Nov. 13, 2009, 8pgs; & International Preliminary Report on Patentability, Oct. 21, 2010, 5pgs.

Jin et al., "Hybrid supercapacitor based on MnO2 and columned FeOOH using $Li_2$ $SO_4$ electrolyte solution," Journal of Power Sources, 2008, 175:686-691.

Jurewicz, K. et al., "Towards the Mechanism of Electrochemical Hydrogen Storage in Nanostructured Carbon Materials," Appl. Phys. A 78, 981-987 (2004).

Kanoh et al., "Electrochemical Intercalation of Alkali-Metal Ions into Birnessite-Type Manganese Oxide in Aqueous Solution," Langmuir, 1997, 13:6845-6849.

Kanoh et al., "Equilibrium Potentials of Spinel-Type Manganese Oxide in Aqueous Solutions," J. Electrochem. Soc., Nov. 1993, 140(11):3162-3166.

Kim et al., "Electrochemical properties of sodium/pyrite battery at room temperature," Journal of Power Sources, 2007, 174:1275-1278.

Kim et al., "Ionic conductivity of sodium ion with $NaCF_3$ $SO_3$ salts in electrolyte for sodium batteries," Materials Science Forum, 2005, 486-487:638-641.

Komaba et al., "Enhanced Supercapacitive Behaviors of Birnessite Type Manganese Dioxide," Abstract from 214th ECS Meeting, Honolulu, HI, Oct. 12-17, 2008.

Li et al., "A study of nitroxide polyradical/activated carbon composite as the positive electrode material for electrochemical hybrid capacitor," Electrochimica Acta, 2007, 52:2153-2157.

Li et al., "Rechargeable Lithium Batteries with Aqueous Electrolytes," Science, May 20, 1994, 264:1115-1118.

Ma et al., "A novel concept of hybrid capacitor based on manganese oxide materials," Electrochemistry Communications, 2007, 9:2807-2811.

Mi et al., "Electrochemical behaviors of solid $LiFePO_4$ and $Li_{0.99}$ $Nb_{0.01}$ $FePO_4$ in $Li_2$ $SO_4$ aqueous electrolyte," Journal of Electroanalytical Chemistry, 2007, 602:245-254.

Park et al., "A Study of Copper as a Cathode Material for an Ambient Temperature Sodium Ion Batter," Journal of the Electrochemical Society, 2001, 148(12):A1346-A1351.

Park et al., "Room-Temperature Solid-State Sodium/Sulfur Battery," Electrochemical and Solid-Satte Letters, 2006, 9(3):A123-A125.

Pitcher, Graham, "If the cap fits . . . How supercapacitors can help to solve power problems in portable products," New Electronics, Portable Products Special Report, www.neon.co.uk, Mar. 28, 2006, 25-26.

Renuka, "An Investigation on Layered Birnessite Type Manganese Oxides for Battery Applications," Journal of Power Sources, 2000, 78: 144-152.

Rydh et al., "Energy analysis of batteries in photovoltaic systems. Part I: Performance and energy requirements," Energy Conversion and Management, 2005, 46:1957-1979.

Rydh et al., "Energy analysis of batteries in photovoltaic systems. Part II: Performance and energy requirements," Energy Conversion and Management, 2005, 46:1980-2000.

Sauvage et al., "Study of the Insertion/Deinsertion Mechanism of Sodium into $Na_{0.44}$ $MnO_2$," Inorganic Chemistry, 2007, 46:3289-3294.

Sauvage et al., "Study of the potentiometric response towards sodium ions of $Na_{0.44-x}$ $MnO_2$ for the development of selective sodium ion sensors," Sensors and Actuators B, 2007, 120:638-644.

Spahr et al., "Electrochemical insertion of lithium, sodium, and magnesium in molybdenum(VI) oxide," Journal of Power Sources, 1995, 54:346-351.

Su et al., "Symmetric Self-Hybrid Supercapacitor Consisting of Multiwall Carbon Nanotubes and Co-Al Layered Double Hydroxides," Journal of the Electrochemical Society, 2008, 155(2):A110-A114.

Tani et al,. "Alkali Metal Ion-Selective Electrodes Based on Relevant Alkali Metal Ion Doped Manganese Oxides," Mikrochim. Acta 1998, 129:81-90.

Tevar et al., Cycling-Induced Crystallographic & Morphological Changes in Na4Mn9O18. 214th ECS Meeting, Abstract #642, The Electrochemical Society, Oct. 2008.

Toupin et al., "Charge Storage Mechanism of $MnO_2$ Electrode Used in Aqueous Electrochemical Capacitor," Chemistry of Materials, 2004, 16: 3184-3190.

Wang et al., "Improvement of cycle performance of lithium ion cell $LiMn_2$ $O_4$/$Li_x$ $V_2$ $O_5$ with aqueous solution electrolyte by polypyrrole coating an anode," Electrochimica Acta, 2007, 52:5102-5107.

Wang et al., "A New Concept Hybrid Electrochemical Supercapacitor: Carbon/$LiMn_2$ $P_4$ Aqueous System," Electrochemistry Communications, 2005, 7:1138-1142.

Whitacre et al., "Na4Mn9O18 as a Positive Electrode Material for an Aqueous Electrolyte Sodium-Ion Energy Storage Device," Electrochemistry Communications, 2010, 12:463-466.

Yang et al., "Interfacial synthesis of porous $MnO_2$ and its application in electrochemical capacitor," Electrochimica Acta, 2007, 53:752-757.

Zhuo et al., "The preparation of $NaV_{1-x}$ $Cr_x$ $PO_4$ F cathode materials or sodium-ion battery," Journal of Power Sources, 2006, 160:698-703.

Ellis et al., "A Multifunctional 3.5 V Iron-based Phosphate Cathode for Rechargeable Batteries," Nature Materials, vol. 6, Oct. 2007.

Tarascon et al., "Chemical and Electrochemical Insertion of Na into the Spinel λ-$MnO_2$ Phase," Solid State Ionics 57 (1992), 113-120.

Wang et al., "Hybrid Aqueous Energy Storage Cells Using Activated Carbon and Lithium-Intercalated Compounds," Journal of the Electrochemical Society, 153 (2) A450-A454 (2006).

Li et al., "Hydrogen Storage Alloy and Carbon Nanotubes Mixed Catalyst in a Direct Borohydride Fuel Cell," J. Mater. Sci. Technol., 2011, 27 (12), 1089-1093.

Zhu et al., "Possible Use of Ferrocyanide as a Redox Additive for Prevention of Electrolyte Decomposition in Overcharged Nickel Batteries," Electrochimica Acta 48 (2003) 4033-4037.

Candelaria et al., "Nanostructured Carbon for Energy Storage and Conversion," Nano Energy (2012) 1, 195-220.

Jayalakshmi et al., "Charge-discharge Characteristics of a Solid-State Prussian Blue Secondary Cell," Journal of Power Sources, 87 (2000), 212-217.

Bakhmatyuk et al., "Intercalation Pseudo-Capacitance in Carbon Systems of Energy Storage," Rev. Adv. Mater. Sci. 14 (2007) 151-156.

Liu et al., "Hydrogen Storage Alloys as the Anode Materials of the Direct Borohydride Fuel Cell," Journal of Alloys and Compounds, 454 (2008), 280-285.

Luo et al., "Raising the Cycling Stability of Aqueous Lithium-ion Batteries by Eliminating Oxygen in the Electrolyte," Nature Chemistry, vol. 2, Sep. 2010.

Lu et al., "Prussian Blue: A New Framework of Electrode Materials for Sodium Batteries," Chem. Commun., 2012, 48, 6544-6546.

Wessells et al., "Copper Hexacyanoferrate Battery Electrodes with Long Cycle Life and High Power," Nature Communications 2, Nov. 2011.

(56) References Cited

OTHER PUBLICATIONS

Plichta et al., "Lithium Ion Aqueous Cells," Army Research Laboratory, ARL-TR-422, Feb. 1995.

Begam et al., "NASICON Open Framework Structured Transition Metal Oxides for Lithium Batteries," (2010), Chong Rae Park (Ed.), ISBN: 978-953-307-058-2, InTech, DOI: 10.5772/9115. Available from: http://www.intechopen.com/books/lithium-ion-batteries/nasicon-open-framework-structured-transition-metal-oxides-for-lithium-batteries.

Zhang et al., "Redox Shuttle Additives for Lithium-Ion Battery," (2012), Dr. Ilias Belharouak (Ed.), ISBN: 978-953-51-0077-5, InTech, Available from: http://www.intechopen.com/books/lithium-ion-batteries-new-developments/redox-shuttle-additives-for-lithium-ion-battery.

Pasta et al., "A High-Rate and Long Cycle Life Aqueous Electrolyte Battery for Grid-Scale Energy Storage," Nature Communications 3, Article No. 1149, Oct. 23, 2012, Abstract.

L. Redey, "Overcharge Protection in Li-alloy/metal Disulfide Cells," Meeting of the Electrochemical Society, Honolulu, HI, Oct. 18, 1987, Abstract.

L. Redey, "Chemical Overcharge and Overdischarge Protection for Li-alloy/transition-metal Sulfide Cells," Journal of the Electrochemical Society, vol. 136:7, Jul. 1989, Abstract.

Fic et al., "Unusual Energy Enhancement in Carbon-based Electrochemical Capacitors," J. Mater. Chem., 2012, 22, Sep. 2012, Abstract.

Qian et al., "$Na_xM_yFe(CN)_6$ (M=Fe, Co, Ni): A New Class of Cathode Materials for Sodium Ion Batteries," Journal of Electrochemistry, vol. 18, Issue 2: 108-112 (2012).

Leonhard et al., "NASICON Electrode for Detecting Sodium Ions," Sensors and Acuators B, 18-19 (1994), 329-332.

Vijayan et al., "NASICON Materials: Structure and Electrical Properties," (2012), Prof. Zaharii Zakhariev (Ed.), ISBN: 978-953-307-934-9, InTech, Available from: http://www.intechopen.com/books/polycrystalline-materials-theoretical-and-practical-aspects/nasicon-materials-structure-and-electrical-properties.

\* cited by examiner

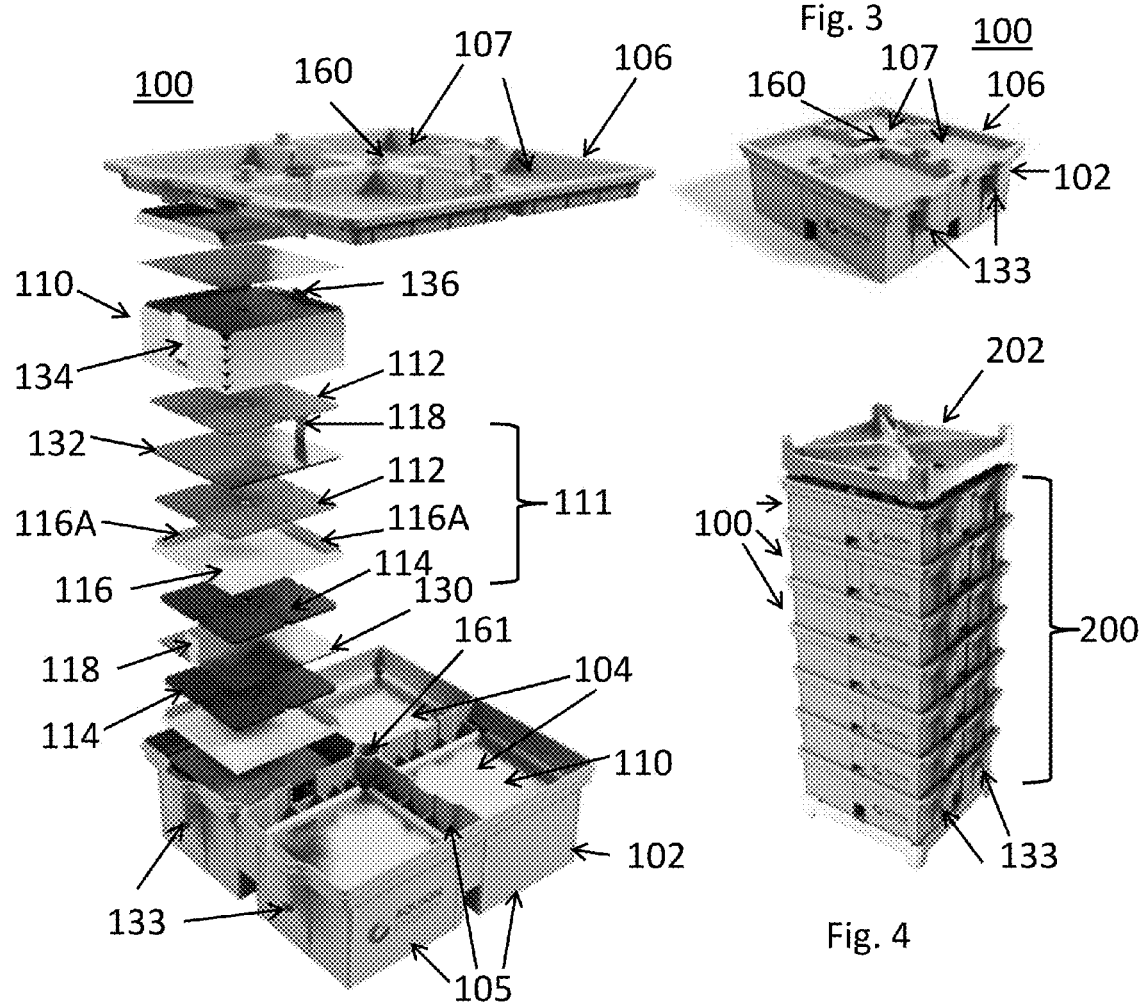
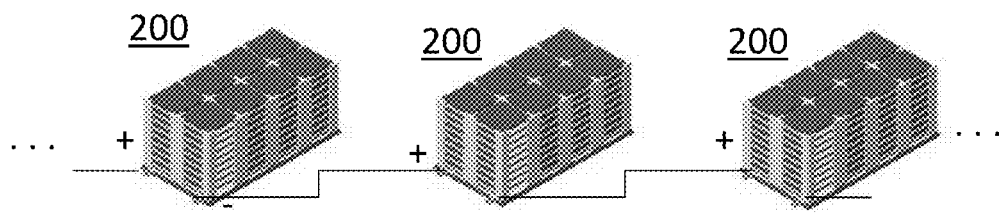

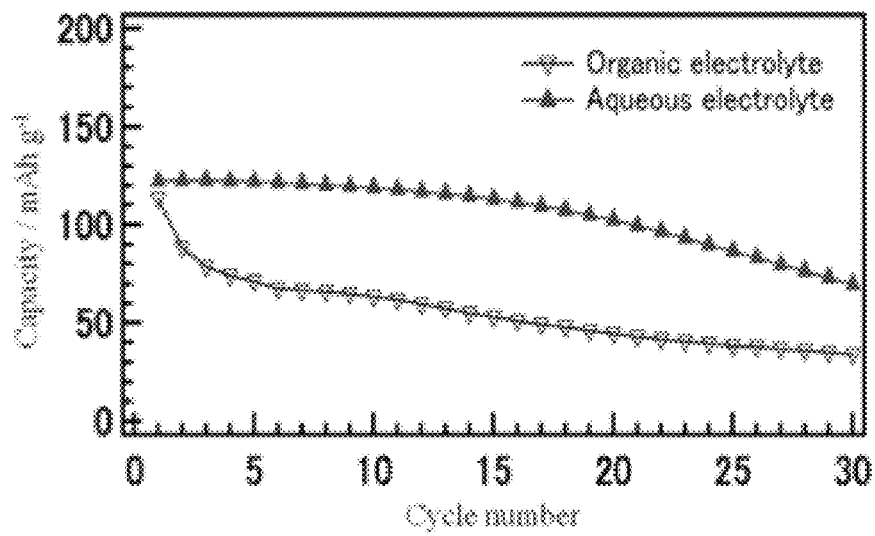

Fig. 7C Prior Art  Comparison of cyclabilities for carbothermally treated $NaTi_2(PO_4)_3$ in an organic electrolyte of 1 M $NaClO_4$/EC:DMC (1:1 in volume) and aqueous electrolyte with 2 M $Na_2SO_4$ at a rate of 2.0 mA $cm^{-2}$.

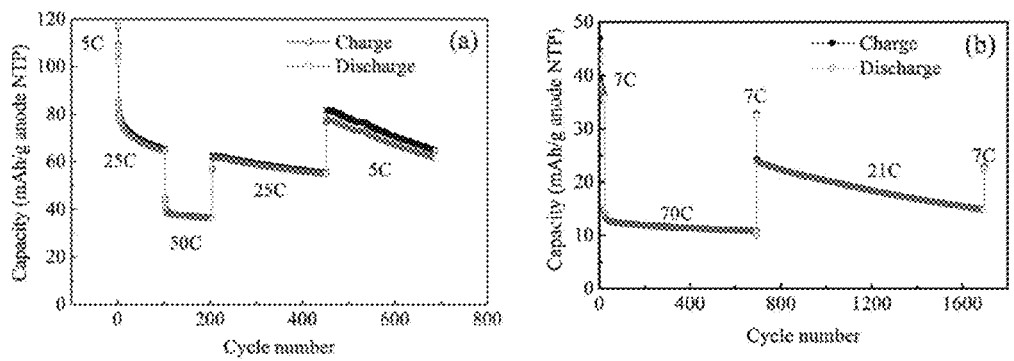

Galvanostatic cycling performance of two-electrode NTP-C/NMO full cells with different capacity ratios of anode to cathode. (a) The loading of anode and cathode active materials are 8.2 mg/cm² and 24.5 mg/cm² with capacity ratio of 1:1. Both electrodes contain 80 wt% active material, 16 wt% CNT and 4% PTFE. (b) The mass of anode and cathode active materials are 16.5 mg/cm² and 17.8 mg/cm² with capacity ratio of 2.78:1. Both electrodes contain 80 wt% active material, 10 wt% CNT and 10% PTFE.

Fig. 10A
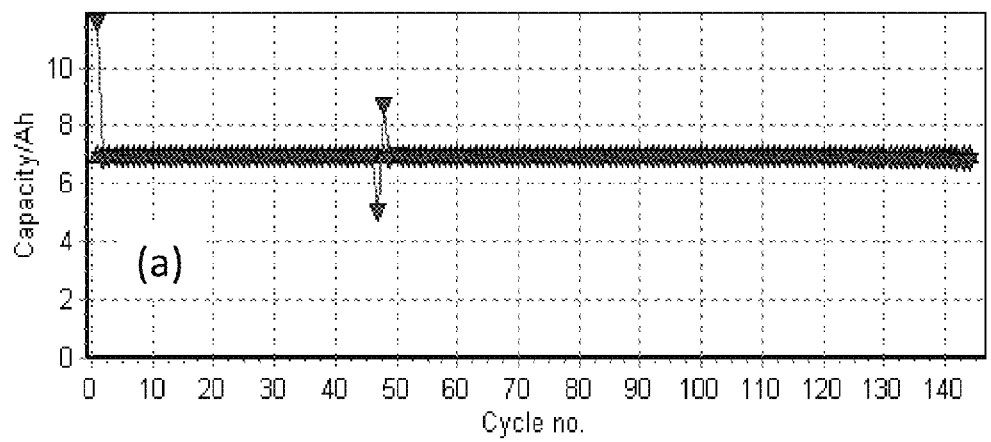
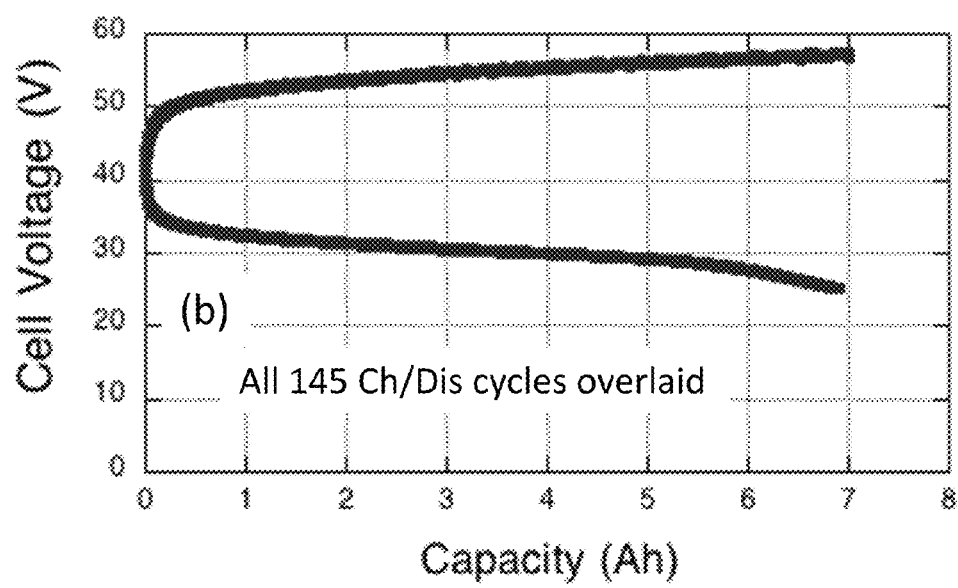
Fig. 10B

US 8,945,756 B2

COMPOSITE ANODE STRUCTURE FOR AQUEOUS ELECTROLYTE ENERGY STORAGE AND DEVICE CONTAINING SAME

CROSS-REFERENCE TO RELATED PATENT APPLICATION

The present application claims the benefit of U.S. Provisional Patent Application No. 61/736,137 entitled "Composite Anode Structure for Aqueous Electrolyte Energy Storage and Device Containing Same" filed Dec. 12, 2012. The entire contents of the provisional application is incorporated herein by reference.

FIELD

The present invention is directed to ensembles of electrochemical cells and in particular to hybrid energy storage devices.

BACKGROUND

Small renewable energy harvesting and power generation technologies (such as solar arrays, wind turbines, micro sterling engines, and solid oxide fuel cells) are proliferating, and there is a commensurate strong need for intermediate size secondary (rechargeable) energy storage capability. Energy storage batteries for these stationary applications typically store between 1 and 50 kWh of energy (depending on the application) and have historically been based on the lead-acid (Pb acid) chemistry. The batteries typically comprise a number of individual cells connected in series and parallel to obtain the desired system capacity and bus voltage.

For vehicular and stationary storage applications, it is not unusual to have batteries with bus voltages in the hundreds or thousands of volts, depending on application. In these cases, where many units are connected electrically in series, there is typically an inherent need for these cells to be as similar to each other as possible. In the event that the cells are not similar enough, a cell-level monitoring and controlling circuit is commonly necessary. If some set of cells in a string of cells have lower charge capacity than others in the same string, the lower capacity cells will reach an overcharge/undercharge condition during full discharge or charge of the string. These lower capacity cells will be de-stabilized (typically due to electrolyte corrosion reactions), resulting in diminished lifetime performance of the battery. This effect is common in many battery chemistries and is seen prominently in the Li-ion battery and in the supercapacitor pack. In these systems, costly and intricate cell-level management systems are needed if the cells are not produced to exacting (and expensive) precision.

SUMMARY

An embodiment relates to an anode electrode for an energy storage device includes both an ion intercalation material and a pseudocapacitive material. The ion intercalation material may be a NASICON material, such as $NaTi_2(PO_4)_3$ and the pseudocapacitive material may be an activated carbon material.

Another embodiment relates to a method of operating the energy storage device comprising a plurality of electrically connected electrochemical energy storage cells, wherein each cell comprises a negative anode electrode comprising both an ion intercalation material and an electrochemical double layer capacitive and/or pseudocapacitive material, a positive cathode electrode, a separator, and an aqueous electrolyte, the method comprising charging and discharging the plurality of electrochemical energy storage cells, wherein the electrochemical double layer capacitive and/or pseudocapacitive material protects the ion intercalation material from corrosion by gettering hydrogen species that evolve during the charging step.

BRIEF DESCRIPTION OF THE DRAWINGS

FIG. 2 is an exploded view of a device according to an embodiment containing four prismatic/parallel stacks connected in series inside a walled polymer housing.

FIG. 3 is a perspective view of the housing of FIG. 2.

FIG. 4 is a perspective view of a stack of seven housings shown in FIG. 3 which are connected electrically in series. This stack of housings includes 28 prismatic/parallel stacks of cells connected in series to form an about 56 V battery system.

FIG. 5 is a schematic perspective view of multiple stacks of housings connected electrically in series.

FIGS. 7C, 7D and 7E are plots of charge/discharge capacity as a function of cycle for prior art cells described in S. Park et al., Journal of the Electrochemical Society, 158 (10) A1067-A1070 (2011), and Zeng et al., Advanced Energy Materials 3 290-294, (2013).

FIGS. 10A and 10B are respective plots of capacity versus cycle number and voltage versus capacity showing the long term stability of a string of 28 cell stacks made with composite activated carbon/$NaTi_2(PO_4)_3$ anode and a $\lambda\text{-}MnO_2$ cathode

DETAILED DESCRIPTION

Figure 1:
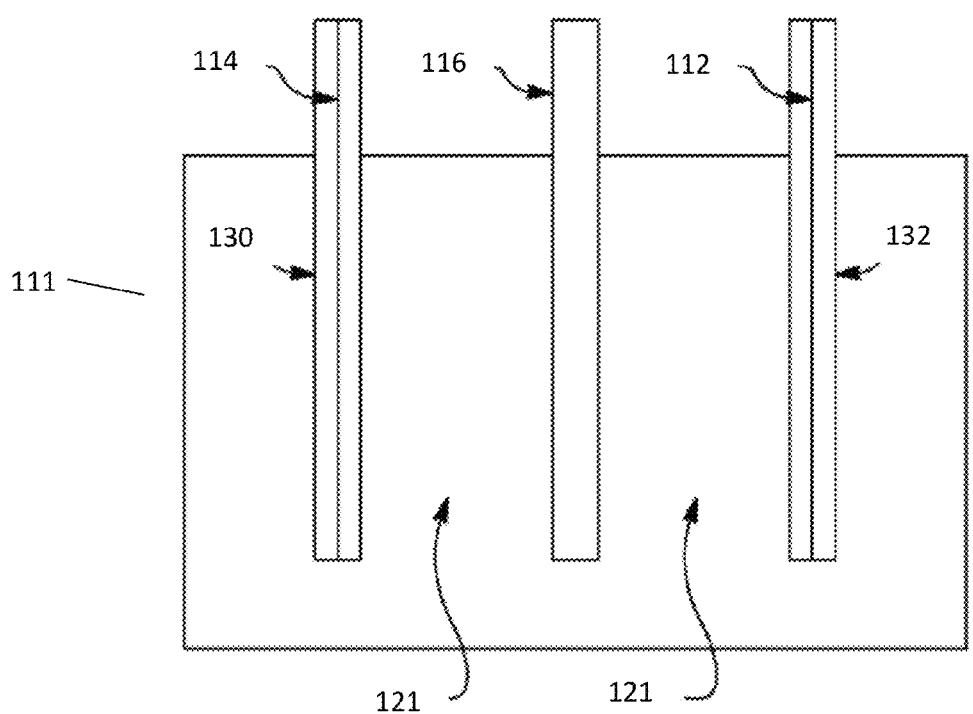
FIG. 1 illustrates an individual electrochemical cell according to an embodiment.

It would be very useful to have batteries that can be built with cells that have a higher cell-to-cell charge storage capacity variation without sacrificing the integrity of the pack. The inventor has discovered an aqueous electrolyte electrochemical cell that is able to self-regulate using internal electrochemical reactions upon overcharge. This self-regulation allows for high voltage strings of cells to be manufactured with a high tolerance for cell-to-cell charge capacity variation. Preferably, but not necessarily, the system lacks a cell level voltage monitoring and current control circuit (also known as a cell-level battery management system, or BMS). Thus, the cell level voltage is not monitored or controlled.

Without being bound by any particular theory, the inventor believes that the mechanism of self-regulation is the local electrolysis of the aqueous electrolyte that takes place at the anode electrode. As electrolysis occurs, a small amount of hydrogen is generated along with $OH^-$ species. The $OH^-$ species locally increase the pH, thereby pushing the voltage stability window of electrolyte in the immediate vicinity of the anode to a lower value. This subsequently eliminates the continued evolution of hydrogen.

It is believed that at least a portion of the hydrogen species formed on charging of the cell is stored in, on and/or at the anode electrode of the cell during the period of overcharge. For brevity, the hydrogen species formed on charging of the cell and stored in, on and/or at the anode electrode will be referred to as "anode stored hydrogen" hereafter. It is believed that the hydrogen may be stored by being adsorbed (e.g., by van der Waals forces) and/or chemically bound (e.g., by covalent bonding) to the anode electrode surface and/or may be stored in the bulk of the activated carbon anode, for example by intercalation into the activated carbon lattice, adsorption to sidewalls of the activated carbon pores and/or by chemical bonding to the sidewalls of activated carbon pores. It is also possible that the hydrogen may be stored at the anode as a capacitive or pseudocapacitive double layer at (i.e., near) the anode surface. Preferably, a majority of the hydrogen species (e.g., at least 51%, such as 60-99%, including 70-90%) is stored in and/or at the anode electrode. Any remaining generated hydrogen species may evaporate from the cell as hydrogen gas.

In one preferred embodiment described in more detail below, the active material is a blend of a pseudocapacitive and/or capacitive material, such as activated carbon, and a high capacity, low cost sodium intercalation material that is stable under anodic potentials in an aqueous electrolyte, such as a neutral pH aqueous electrolyte. Specifically, $NaTi_2(PO_4)_3$ is a non-limiting preferred intercalation material which can function within a particular potential range to store alkali ions from the electrolyte during device charging. When the intercalation material is full of ions and the cell is charged further, the hydrogen interactive species then interacts with the species that are generated during overcharge of the cell.

When the battery is allowed to discharge, it is believed that at least a portion of the anode stored hydrogen is released from the anode and is consumed/reacted (i.e., recombines) with local $OH^-$ to re-form water, or instead diffuses to the cathode side of the cell, where it can be similarly consumed. Preferably, a majority of the released anode stored hydrogen (e.g., at least 51%, such as 60-99%, including 70-90%) is reacted with local $OH^-$ to re-form water. Any remaining released anode stored hydrogen may escape from the cell as hydrogen gas.

The inventor has discovered that the use of an anode electrode of a material with a high overpotential for hydrogen evolution from water, preferably a composite (e.g., blend) of the $NaTi_2(PO_4)_3$ intercalation material and activated carbon, combined with the local electrolysis and recombination of the aqueous electrolyte allows for an electrode environment that is highly tolerant to overcharge along with having high energy density.

An embodiment of the invention includes an electrochemical storage device that includes electrically connected cells (in series and/or in parallel) having a wider as-manufactured cell-to-cell variation in charge storage capacity than conventional charge storage devices. In this embodiment, cells with a lower charge storage capacity in the same string of cells charge to higher potentials during cycling. When this happens, the effect described above is believed to occur in at least one of the cells late in the charging step with no long-term detriment to the cell string.

In an embodiment, the electrochemical storage device is a hybrid electrochemical energy storage system in which the individual electrochemical cells include a hybrid anode containing an alkali ion intercalation material mixed with a pseudocapacitive or double-layer capacitor material, such as activated carbon, coupled with a stable intercalation-reaction cathode material. Without wishing to be bound by a particular theory, in this system, the anode stores charge first through a alkali-ion reaction with, and then through a reversible nonfaradiac reaction of alkali (e.g., Li, Na, K, etc.) or Ca cations on the surface of the capacitive and/or pseudocapacitive material contained in the electrode though double-layer and/or pseudocapacitance, while the cathode material undergoes a reversible faradic reaction in a transition metal oxide or a similar material that intercalates and deintercalates alkali or Ca cations similar to that of a Li-ion battery.

An example of a prior art Li-based system has been described by Wang, et al., which utilizes a spinel structure $LiMn_2O_4$ battery electrode, an activated carbon capacitor electrode, and an aqueous $Li_2SO_4$ electrolyte. Wang, et al., *Electrochemistry Communications*, 7:1138-42(2005). In this system, the negative anode electrode stores charge through a reversible nonfaradiac reaction of Li-ion on the surface of an activated carbon electrode. The positive cathode electrode utilizes a reversible faradiac reaction of Li-ion intercalation/deintercalation in spinel $LiMn_2O_4$.

A different prior art system is disclosed in U.S. patent application Ser. No. 12/385,277, filed Apr. 3, 2009, hereby incorporated by reference in its entirety. In this system, the cathode electrode comprises a material having a formula $A_xM_yO_z$. A is one or more of Li, Na, K, Be, Mg, and Ca, x is within a range of 0 to 1 before use and within a range of 0 to 10 during use. M comprises any one or more transition metals, y is within a range of 1 to 3 and z is within a range of 2 to 7. The anode electrode comprises activated carbon and the electrolyte comprises $SO_4^{2-}$, $NO_3^-$, $ClO_4^-$, $PO_4^{3-}$, $CO_3^{2-}$, $Cl^-$, or $OH^-$ anions. Preferably, the cathode electrode comprises a doped or undoped cubic spinel $\lambda$-$MnO_2$-type material or a $NaMn_9O_{18}$ tunnel structured orthorhombic material, the anode electrode comprises activated carbon and the electrolyte comprises $Na_2SO_4$ solvated in water. The present embodiments also differ from this prior art reference by including in the anode material both a capacitive/pseudocapacitive material and an additional intercalation material.

FIG. 1 is a schematic illustration of an exemplary electrochemical cell 111 according to an embodiment. The cell 111 includes a cathode side current collector 130 in contact with a cathode electrode 114. The cathode electrode 114 is in contact with an aqueous electrolyte solution 121, which is also in contact with an anode electrode 112. The cell 111 also includes a separator 116 located in the electrolyte solution 121 at a point between the cathode electrode 114 and the anode electrode 112. The anode electrode is also in contact with an anode side current collector 132. In FIG. 1, the components of the exemplary cell 111 are shown as not being in contact with each other. The cell 111 was illustrated this way to clearly indicate the presence of the electrolyte solution 121 relative to both electrodes. However, in actual embodiments, the cathode electrode 114 is in contact with the separator 116, which is in contact with the anode electrode 112.

In an embodiment, the electrochemical cell is a hybrid electrochemical cell. That is, the cathode electrode 114 in operation reversibly intercalates alkali metal cations and the anode electrode 112 comprises a composite of capacitive/pseudocapacitive and intercalation based electrode materials which stores charge through (1) a reversible intercalation reaction of alkali metal cations in anode electrode and (2) a capacitive/pseudocapacitive partial charge transfer surface interaction with alkali metal cations on a surface of the anode electrode.

In one embodiment, the cell 111 is "anode limited". That is, the charge storage capacity of the anode electrode 112 is less than that of the cathode electrode 114. The charge storage capacity of an electrode is the product of the mass of the electrode and the specific capacity (in units of Ah/kg) of the electrode material. Thus, in an anode limited cell, the mass of the active cathode material multiplied by the usable specific capacity of the cathode material is greater than the mass of the active anode material multiplied by the useable specific capacity of the anode material. Preferably, the storage capacity of the anode electrode 112 available before water begins electrolysis at the anode electrode/electrolyte interface is 50-90%, such as 75-90% of the charge storage capacity of the cathode electrode 114.

In a preferred embodiment, the cell is an unbalanced cell in which the product of the specific capacity of the anode and the load of the anode is less than the product of the specific capacity of the cathode and the load of the cathode. For example, the cathode product may be at least 20% greater, such as 50-500%, for example 100-200% greater than the anode product. Thus, the capacity (in the units of mAh) of the anode is lower (such as at least 50-500% lower) than that of the cathode.

The unbalanced cell causes the water to electrolyze at high states of charge at only the anode (there is no oxygen generation at the cathode) and the generated hydrogen ions to become anode stored hydrogen, when the anode potential is below the electrolysis potential of water. This is not necessarily an "overcharge" condition because the battery may be designed to be operated at this low anode potential.

Preferably, the anode electrode 112 is made from a material that is corrosion resistant (resistant to the hydrogen and OH species formed by electrolysis) at the charging voltage as will be discussed below.

A method according to an embodiment includes charging the energy storage system 100 at a voltage 1.5 times greater and/or 0.8 volts higher than a voltage at which electrolysis of the water at the anode electrode of the cells is initiated, without inducing corrosion of the anode electrode material.

Cell Stack and Assembly

FIGS. 2 and 3 illustrate an electrochemical device 100, as described in U.S. application Ser. No. 13/666,452, filed on Nov. 1, 2012 (published as US 20013/0059185A1) and incorporated herein by reference in its entirety. As illustrated, the electrochemical device 100 includes a housing 102 that includes four cavities 104. The housing 102 may have more or fewer than four cavities 104. Each cavity is defined by walls 105 of the housing 102.

Preferably, each cavity 104 includes a stack 110 of electrochemical cells 111. Each electrochemical cell 111 includes an anode 112, a cathode 114 and a separator 116 located between the anode 112 and the cathode 114. The electrochemical cells 111 may be electrically connected in series or prismatically in the stack 110 of electrochemical cells 111. In a prismatic configuration, the electrochemical cells 111 in the stack 110 are connected in parallel as illustrated in FIG. 2.

Each electrochemical cell 111 further includes two current collectors 130, 132 provided to collect the current generated by the electrochemical cells 111. The current collectors 130, 132 may be made of any suitable electrically conducting material, such as carbon (e.g. graphite) or metal. In a prismatic stack 110, described for example in U.S. patent application Ser. No. 13/043,787 and illustrated in FIG. 2, pairs of electrochemical cells 111 are configured "front-to-front" and "back-to-back." The cathode current collector 130 may be located in between cathodes 114 of adjacent electrochemical cells 111. The resulting prismatic stack 110 therefore may include a plurality of electrochemical cells 111 that are stacked in pairs, front-to-front and back-to-back, alternating adjacent anode electrodes 112 and adjacent cathode electrodes 114.

Preferably, the anodes 112, cathodes 114, separators 116 and current collectors 130, 132 are freely stacked and are not laminated to each other in the cavities 104. That is, no adhesives or binders are located between the individual components (anodes 112, cathodes 114, separators 116 and current collectors 130, 132) in the stacks 110 as are typically found in conventional laminated electrochemical cells. Instead, one embodiment of the present invention applies a longitudinal pressure force to a plurality of freely stacked electrochemical cells that forces adjacent cell elements into mating contact to improve the electrochemical reaction between the anodes and cathodes and the electrolyte that fills the cavities as well as to improve electrical contact between the current collectors corresponding anodes and cathodes to increase current flow to the current collectors. The anode electrode 112 and/or the cathode electrode 114 may be made of two or more discrete pieces, such as 4, 6, 9 or any number of discrete pieces. As illustrated in FIG. 2, the cathode electrode 114 includes 4 discrete pieces. In an embodiment, the area of the cathode current collector 130 when viewed from above is greater than the area of the cathode electrode pieces 114. Similarly, the area of the anode current collector 132 when viewed from above may be greater than the area of the anode electrode pieces 112.

In an aspect of this embodiment, the separator 116 includes flanges 116A around the periphery of the separator 116. The flanges 116A define one or more cavities that are configured to receive the anode/cathode electrode pieces 112, 114. In another aspect, the electrochemical storage cells 111 include a plurality of flexible, electrically conductive contacts (e.g., tabs) 118 operatively connected to the plurality of cathode and anode current collectors 130, 132. The flexible, electrically conductive contacts 118 may be affixed to one side of the cathode and anode current collectors 130, 132. In this embodiment, electrical connection to the stacks 110 of electrochemical storage cells 111 in adjacent cavities 104 in the housing 102 may be made by draping the flexible, electrically conductive contacts 118 over the walls 105 between adjacent cavities 104 and connecting the stacks 110. The stacks 110 in adjacent cavities 104 may be electrically connected in series, in parallel or combination thereof as desired.

FIG. 2 illustrates an embodiment of an electrochemical device 100 having four adjacent stacks 110 configured in a 2×2 pattern in a housing having four cavities 104 in the 2×2 pattern. The adjacent stacks 110 are electrically connected in series. Alternatively, adjacent stacks may be electrically connected in parallel.

The prismatic stack 110 also includes two electrical buses 134, 136. One electrical bus 134 electrically connected to the anode current collectors 132 in the prismatic stack 110 and one electrical bus connected 136 to the cathode current collectors 130 in the prismatic stack 110.

In an embodiment, the electrical connection from the cathode and anode current collectors 130, 132 to the electrical buses 134, 136 is via the electrically conductive contacts 118. In this manner, the electrochemical cells 111 in the stack 110 can be electrically connected in parallel.

The electrochemical device 100 also includes a liquid or gel electrolyte 121 (shown in FIG. 1) in the cavities 104 which substantially fills the cavity to immerse each electrochemical cell in electrolyte. The housing 102 of the electrochemical device 100 is preferably hermetically sealed with a lid 106, as shown in FIG. 3, to prevent the loss of electrolyte from the electrochemical device 100 and a common gas volume is provided above each cavity between the top of each cavity and the lid to allow outgassing from all of the cavities to collect in the gas volume.

In an embodiment, the lid 106 includes a hole 160 in the center which is aligned with a corresponding hole 161 that extends through the housing 102 for receiving a tie rod there through. The lid 106 may also include lid cavities 107 which are recessed to ensure that a bottom surface of each cavity 107 contacts the top surface of the electrode stack in the corresponding cavity in order to transfer a pressure or compression force from pressure plates 202 through each unit in an assembly 200 when the units are stacked in an assembly, as shown in FIG. 4.

The lid cavities 107 are preferably configured to facilitate stacking of electrochemical devices 100 in a manner that transfer the above described pressure force from one unit device to another. The housing 102 may include features to hold terminals 133 that may be connected to an outside load or to other electrochemical devices 100.

FIG. 5 illustrates another embodiment of an electrochemical energy storage system. In this embodiment, two or more of the stacks of housings illustrated in FIG. 4 are connected in series. In this configuration, very large voltages may be conveniently generated. In an alternative embodiment, two or more of the stacks of housings illustrated in FIG. 4 are connected in parallel. In this configuration, large currents may be provided at a desired voltage.

The electrochemical devices 100 may be at elevated temperatures ranging from 30 to 90° C. during the charging and discharging steps to encourage ion mobility both within the electrolyte and also with the electrode crystalline structures and the porous electrode structures. One method to perform this heating is to use controlled high current pulses through the devices such that they self heat.

Individual device components may be made of a variety of materials as follows.

Composite Anode

In a preferred embodiment of the invention, the anode electrode comprises both an ion intercalation material and a capacitive and/or pseudocapacitive material. For example, the anode electrode may comprise a mixture of a ceramic material which in operation reversibly intercalates and deintercalates alkali metal cations from the electrolyte and a capacitive and/or pseudocapacitive (also referred to herein as "capacitive/pseudocapacitive") material which in operation undergoes a partial non-Faradaic charge transfer surface interaction with alkali metal cations on a surface of the anode electrode. The alkali or alkali earth metal cations, such as sodium, lithium, potassium, calcium, magnesium or a combination thereof are deintercalated from the cathode into the electrolyte and then intercalated into the anode ceramic material during the cell charging cycle. As will be described in more detail below with respect to FIG. 6A, additional alkali or alkali earth ions may be stored capacitively and/or pseudocapacitively in the capacitive/pseudocapacitive material during charging before, during and/or after the intercalation. Furthermore, hydrogen generated during the charging process may also be stored by the capacitive/pseudocapacitive material, to protect the intercalation material from being corroded by the hydrogen. The alkali or alkali earth metal cations (e.g., Na cations) are deintercalated from the anode into the electrolyte during cell discharge cycle (and are then intercalated into the cathode electrode).

Any suitable ceramic intercalation materials and capacitive/pseudocapacitive materials may be used. Preferably, the capacitive/pseudocapacitive material comprises the activated carbon described above or another suitable capacitive/pseudocapacitive material, such as a ceramic capacitive/pseudocapacitive material or a mixture thereof. Optionally, the activated carbon may be an acid washed carbon which was subject to a nitric, sulfuric, hydrochloric, phosphoric or combinations thereof acid surface modification treatment to improve its specific capacitance and pseudocapacitive behavior, as described in U.S. published patent application US 2012/0270102 A1, which is incorporated herein by reference in its entirety. However, the acid washing step may be omitted if desired.

Preferably, the ceramic intercalation material comprises a NASICON material. As described by Vijayan et al., in chapter 4 of the "*Polycrystalline Materials—Theoretical and Practical Aspects*" book (Z. Zachariev, ed.), NASICON materials generally have the following formula: $A_xB_y(PO_4)_3$, where A is an alkali metal ion, B is a multivalent metal ion (e.g., transition metal ion), P is at least 80 atomic percent phosphorus (e.g., 80-100 at % phosphorus and remainder (if any) transition metal(s), such as vanadium), O is oxygen and $0.95 \leq x \leq 3.05$, and $1.95 \leq y \leq 2.05$. The charge compensating A cations occupy two types of sites, M1 and M2 (1:3 multiplicity), in the interconnected channels formed by corner sharing $PO_4$ tetrahedra and $BO_6$ octahedra. M1 sites are surrounded by six oxygen atoms and located at an inversion center and M2 sites are symmetrically distributed around three-fold axis of the structure with tenfold oxygen coordination. In three-dimensional frame-work of NASICON, numerous ionic substitutions are allowed at various lattice sites. Generally, NASICON structures crystallize in thermally stable rhombohedral symmetry and have a formula $AB_2(PO_4)_3$. Preferably, A comprises Li, Na and/or K, and B comprises Ti, Mn and/or Fe. However, members of $A_3M_2(PO4)_3$ family (where A=Li, Na and M=Cr, Fe) crystallize in monoclinic modification of $Fe_2(SO4)_3$-type structure and show reversible structural phase transitions at high temperatures.

Preferably, the anode intercalation material has a formula $AB_{2\pm\delta 1}(PO_4)_{3\pm\delta 2}$, where A comprises at least 5 atomic percent Na, such as 50-100 atomic percent Na, including 75-100 atomic percent Na with the remainder (if any) being Li. Preferably, B comprises at least 50 atomic percent Ti, such as 50-100 atomic percent Ti, including 75-100 atomic percent Ti with the remainder (if any) being Mn or a combination of Mn and Fe. The symbols $\delta 1$ and $\delta 2$ allow for a slight deviation from the strict 1:2:3 atomic ratio of alkali/transition metal/phosphate in the material (i.e., a non-stoichiometric material is permitted). $\delta 1$ and $\delta 2$ may each independently vary between zero and 0.05, such as between zero and 0.01. One preferred material is $NaTi_2(PO_4)_3$. Alternatively, the NASICON material may comprise $LiTi_2(PO_4)_3$ for systems in which lithium is used as the active ion in the electrolyte, or a mixed sodium and lithium containing NASICON material, such as $Li_{1-x}Ti_2(PO_4)_3$, where x varies from 0.05 to 0.95, such as from 0.1 to 0.9 (i.e., a solid solution of $NaTi_2(PO_4)_3$ and $LiTi_2(PO_4)_3$), for systems in which both sodium and lithium are used as the active ions. In general, the NASICON material preferably has a formula $Na_xLi_{(1-x)}Ti_2(PO_4)_3$, where $0.05 \leq x \leq 1$.

Specifically, the present inventors have found that creating a composite anode of $NaTi_2(PO_4)_3$ and surface modified activated carbon can display a marked increase in energy density (Wh/liter) compared to just the activated carbon alone, and with more electrochemical stability than just the $NaTi_2(PO_4)_3$ alone. Without wishing to be bound by a specific theory, it is believed that the increase in energy density and specific capacity may be due to the increased physical density of the composite compared to activated carbon alone. This composite has been found to be completely stable through many cycles due to the stability of the carbon at voltage extremes, compared to the lack of stability typically exhibited by an electrode consisting only of $NaTi_2(PO_4)_3$.

The NASICON material, such as the $NaTi_2(PO_4)_3$ material, can be made in a variety of ways, such as a solid state method in which starting material powders are mixed and then heated (e.g., to decompose the initial reactants, calcine and/or sinter the material). For example, the starting material powders may comprise sodium carbonate, anatase or rutile phase of $TiO_2$, and $NH_4H_2PO_4$ for the $NaTi_2(PO_4)_3$ NASICON material. The resulting NASICON material may be ground or milled into a powder and optionally heated again (e.g., calcined and/or sintered).

The NASICON material powder is then mixed with the pseudocapacitive material, such as activated carbon, and optionally a binder and/or other additive described above (including the hydrogen storage material(s) described above), and then densified to form a composite anode. This results in a composite anode which is a mixture of the NASICON and activated carbon materials. However, in alternative embodiments, the composite anode may comprise discreet regions of the NASICON material in an activated carbon matrix or discreet regions of activated carbon in the NASICON matrix, depending on the ratio of the two materials.

In one embodiment the composite anode material structure contains a blend of $NaTi_2(PO_4)_3$ and activated carbon ("AC"), where the blend ranges from 0.5:9 to 9.5:0.5 mass ratio of $NaTi_2(PO_4)_3$:AC, such as 1:9 to 9:1, such as 1:4 to 4:1, including 3:2 to 2:3, such as a 1:1 ratio. The electrode may be used in a poly-ionic aqueous electrolyte energy storage device (e.g., battery or hybrid device) where the anode is a free standing electrode on a current collector and the anode contains a porous structure that is filled with electrolyte that is an aqueous solution of an alkali-bearing salt with a pH ranging from 4 to 10. As used herein, "poly-ionic" means usable with one or more different ions. However, the storage device may use only one ion (e.g., sodium) or a combination of ions (e.g., Na and Li) that are stored at and/or in the anode electrode. In one embodiment, the composite anode is used in an "anode limited" cell described above in which the charge storage capacity of the anode electrode is less than that of the cathode electrode. However, in another embodiment, the composite anode may be used in cells which are not anode limited.

The composite anode displays a specific capacity value of at least 50 mAh per gram of active material, such as 50 mAh/g to 100 mAh/g, including greater than 70 mAh/g, preferably 75 mAh/g to 100 mAh/g when cycled through a useful voltage range.

Figure 6A:
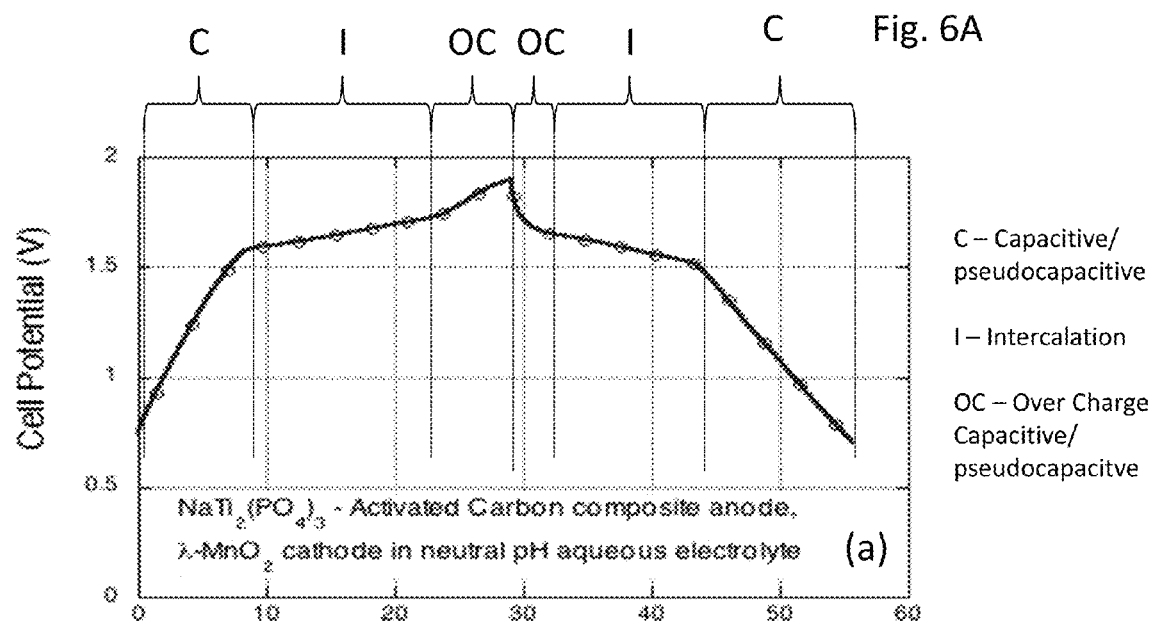
FIG. 6A is plot of cell potential in volts versus capacity in arbitrary units from a single cell with a $\lambda\text{-}MnO_2$ cathode structure and a composite anode containing activated carbon and $NaTi_2(PO_4)_3$. The different voltage characteristics of the capacitive/pseudocapacitive, overcharge and intercalation operating modes are denoted in different regions as a function of capacity by respective letters C, OC and I.
Figure 6B:
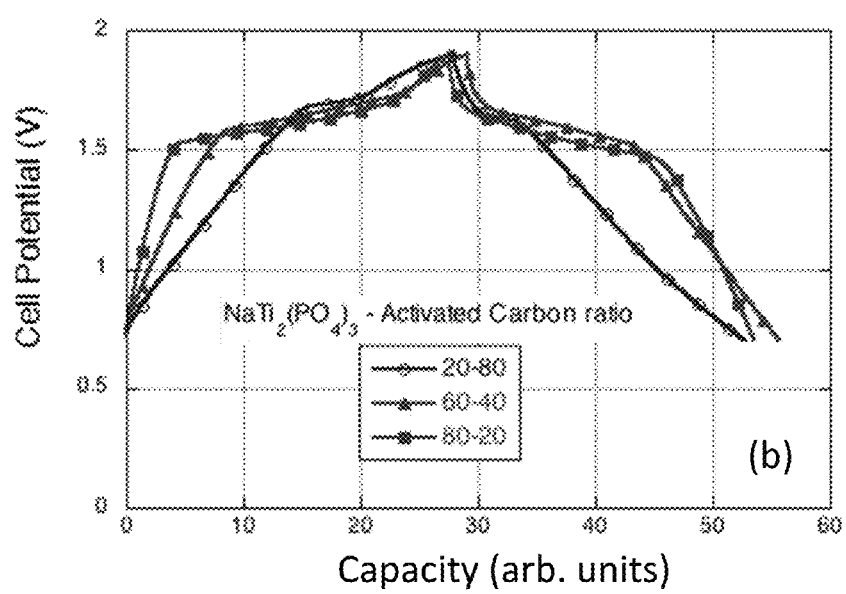
FIG. 6B is a plot showing the voltage vs. capacity (arbitrary units) profiles (for symmetric constant current charge/discharge studies) in single cells containing anodes with different $NaTi_2(PO_4)_3$/activated carbon mass ratios of 20:80, 60:40 and 80:20.

FIGS. 6A and 6B show a typical charge/discharge curve of a cell made with a $LiMn_2O_4$($\lambda$-$MnO_2$) cathode and a composite anode that is comprised of a blend of activated carbon and the $NaTi_2(PO_4)_3$ materials. The electrolyte was 1 M $Na_2SO_4$.

FIG. 6A shows the voltage regions of different types of reactions, including capacitive/pseudocapacitive, intercalation, and over charge (including the evolution and storage of hydrogen). In the middle of the potential versus capacity (in arbitrary units) plot, the overcharge reaction dominates (e.g., at the highest voltage range and middle capacity range), while at bottom and top states of charge (i.e., at lowest voltage range and highest and lowest capacity ranges), the activated carbon capacitive/pseudocapacitive reaction dominates. In the intermediate voltage and capacity ranges between the overcharge and the capacitive/pseudocapacitive regions, the anode function is dominated by the intercalation reaction. For example, for the exemplary cell shown in FIG. 6A, the capacitive/pseudocapacitive material stores charge non-faradiacally (i.e., capacitively and/or pseudocapacitively) at lower voltages (e.g., 0.8 to 1.6 V), the intercalation material stores charge faradiacally (i.e., via intercalation) at intermediate voltages (e.g., 1.6 to 1.75 V), and the hydrogen is evolved and stored by the capacitive/pseodocapacitive material in the over charge regime at highest voltages (e.g., 1.75 to 1.9 V). The voltage ranges may differ for different cell materials and configurations.

During the charging step, the NASICON material having the formula $Na_xLi_{(1-x)}Ti_2(PO_4)_3$, where $0.05 \leq x \leq 1$, intercalates at least one of Li, Na and K alkali cations from the electrolyte regardless of which alkali species is resident in the NASICON material depending on alkali cation availability in the electrolyte and intercalation affinity. For example, in addition to being able to intercalate Na, the $NaTi_2(PO_4)_3$ material may also intercalate Li and/or K, even though Li and K are not resident in this material. Likewise, the $Na_xLi_{(1-x)}Ti_2(PO_4)_3$ material which contains both lithium and sodium (i.e., where x<1) may intercalate K in addition to or instead of Na and/or Li depending on alkali cation availability in the electrolyte and intercalation affinity. Thus, after the charging step, one or more of Li, Na and K intercalate and reside in the host NASICON material structure to form a fully charged intercalation material that has a formula $A_2Li_xNa_{(1-x)}Ti_2(PO_4)_3$, where A is one or more of Li, Na and K. If desired, alkali earth ions (e.g., Mg and/or Ca) may also intercalate into this material in addition to or instead of the alkali ions.

FIG. 6B is a plot showing the voltage vs. capacity (arbitrary units) profiles (for symmetric constant current charge/discharge studies) in single cells containing anodes with different $NaTi_2(PO_4)_3$/activated carbon mass ratios of 20:80, 60:40 and 80:20. In general, the higher the ratio of $NaTi_2(PO_4)_3$ to activated carbon, the more energy the cell will have due to the higher voltage through which the energy is delivered. The capacity is provided in arbitrary units because the data is self normalized to show the effects and the trends of relative amounts of activated carbon and $NaTi_2(PO_4)_3$ in the anode. The result shows several key improvements over prior art pure activated carbon or NASICON anode.

The bulk of the energy is delivered over a more shallow voltage swing compared to that found in devices with just a pure activated carbon anode material or an anode containing pure activated carbon and a similar cathode. Specifically, in this case, most of the embodied energy is delivered between 1.9 and 1 V, representing a 2:1 voltage swing, which is well suited to most off the shelf large format inverter systems.

Figure 7A:
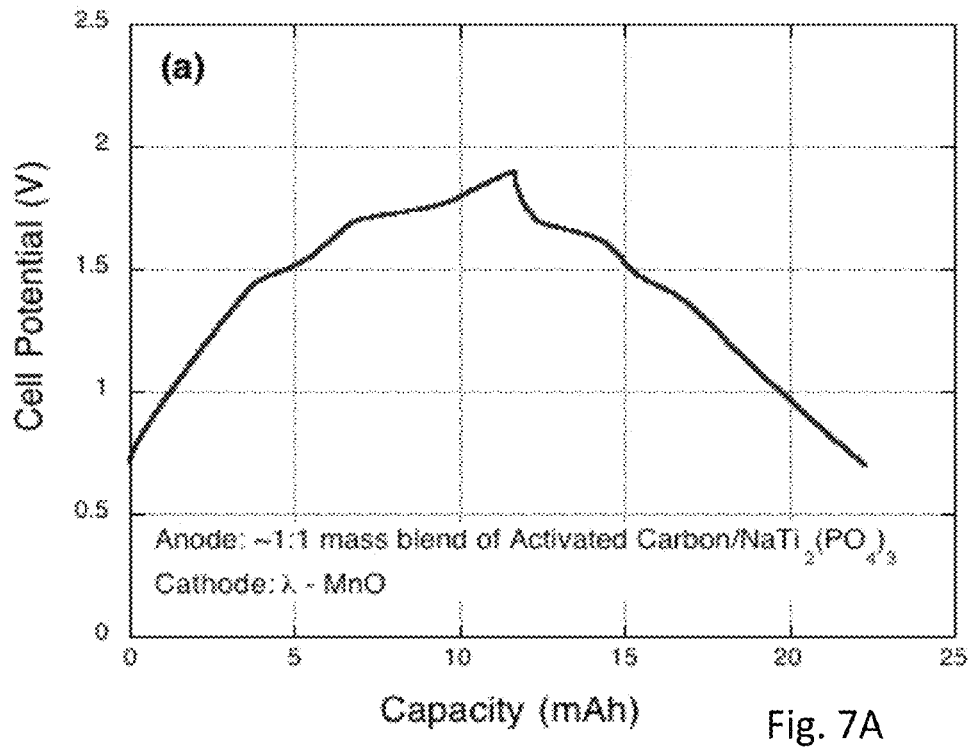
FIG. 7A is plot of voltage vs. capacity collected from a cell with an anode containing a 1:1 mass ratio of activated carbon/$NaTi_2(PO_4)_3$ and a $\lambda\text{-}MnO_2$ based cathode.

FIG. 7A is plot of voltage vs. capacity collected from a cell with an anode containing a 1:1 mass ratio of activated carbon/$NaTi_2(PO_4)_3$ and a $\lambda$-$MnO_2$ based cathode. The plot in FIG. 7A is similar to that shown in FIG. 6A, except that the capacity in FIG. 7A is plotted in units of mAh, rather than arbitrary units as in FIG. 6A.

Figure 7B:
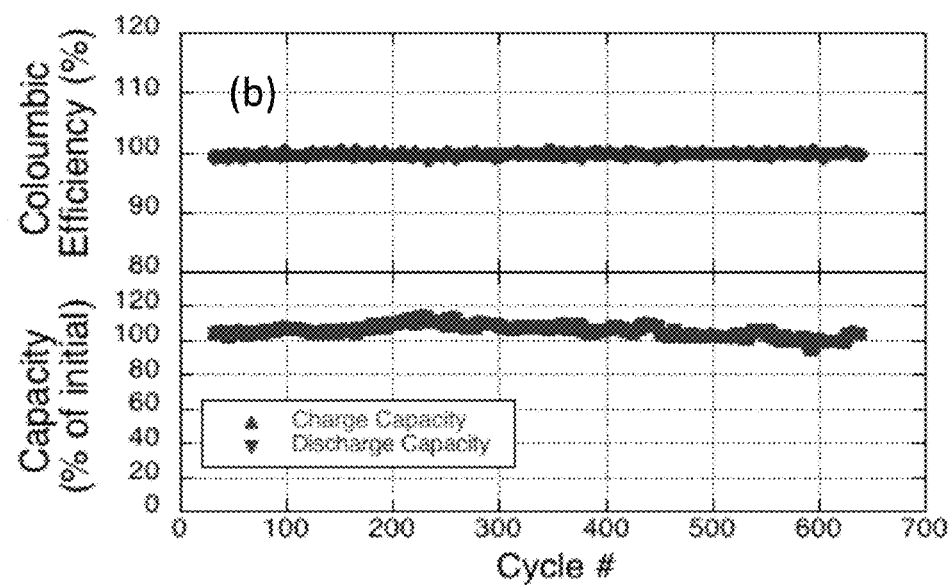
FIG. 7B is a plot of Coulombic efficiency and charge/discharge capacity (as a percent of initial capacity of the cells) as a function of cycle for a cell similar to that shown in FIG. 7A.

FIG. 7B shows the cycle life stability of the test cell described above with respect to FIG. 7A. After more than 600 cycles (e.g., 650 cycles) there is no significant loss in function. In other words, there is no significant decrease in Coulombic efficiency or capacity retention as a function of long term operation. The fluctuations in the data are believed to be due to thermal variation in the laboratory environment. Remarkably, even under slow cycling, there is no capacity fade observed (the capacity changed less than 5% from cycles 15-42 over more than 25 cycles and less than 1% from cycles 20-42 over more than 20 cycles). In general, there was an increase in capacity between cycles 150 and 450 compared to the initial capacity, and the capacity decrease was less than 5% over 650 cycles, such as 0% to a 10% increase in capacity. In general, the anode has a demonstrated physical and electrochemical stability of at least 500 cycles, such as 500-650 cycles in which a state of charge swing is at least 75%, such as 75-100%, without displaying any substantial loss in energy storage function (e.g., in capacity).

This is an advance from previously published work showing the performance of the $NaTi_2(PO_4)_3$ material in aqueous electrolyte environments, where significant capacity fade is observed. For example, as shown in FIGS. 7C-7E, the prior art cells that used a pure $NaTi_2(PO_4)_3$ anode and $MnO_2$-based cathodes in a similar electrolyte as described herein were not stable over even tens of cycles. This is in contrast to the results shown in FIGS. 7A and 7B for the cells of the embodiment of the present invention, in which the capacity was stable (i.e., either increased by 1-10% or did not decrease compared to the initial capacity) as a function of cycle number for over 600 cycles, such as about 650 cycles.

Figure 8A:
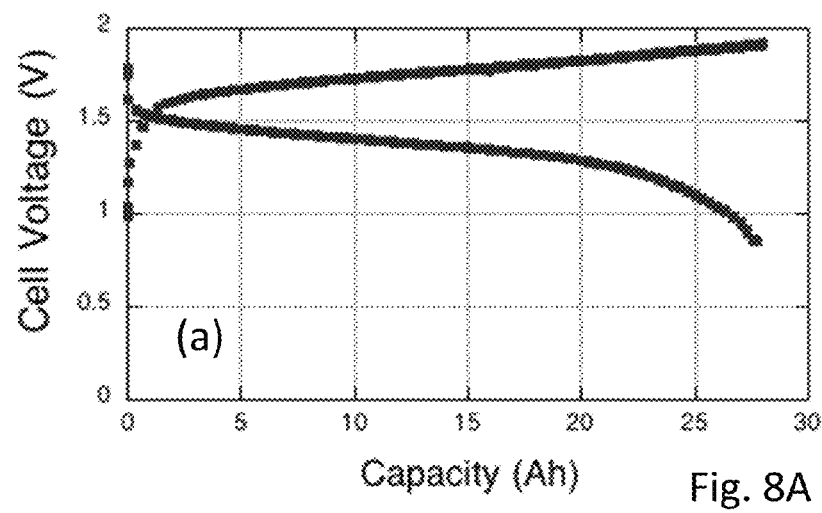
FIGS. 8A and 8B are plots of cell voltage versus capacity (in units of Ah) and capacity versus cycle, respectively. These figures illustrate the performance of a large-format device (25 Ah) made with composite activated carbon/$NaTi_2(PO_4)_3$ anode and a $\lambda\text{-}MnO_2$ cathode.
Figure 8B:
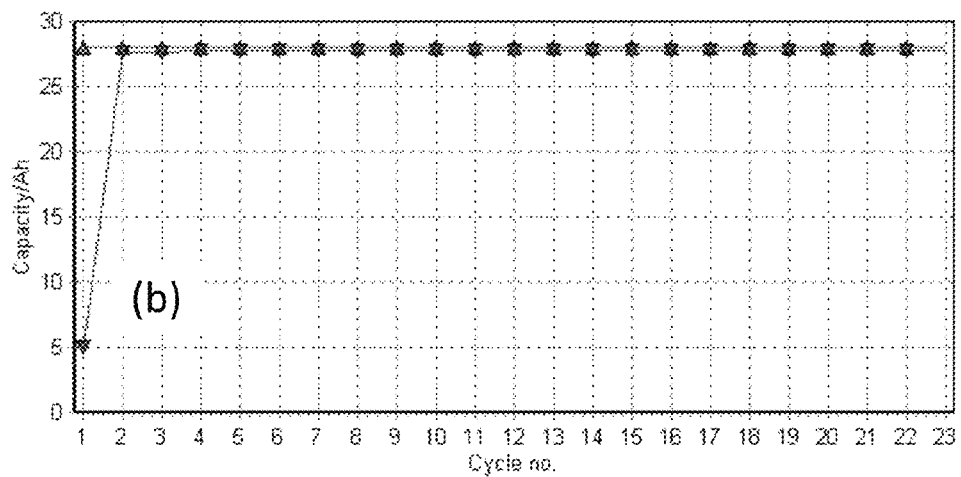

FIGS. 8A and 8B are plots of cell voltage versus capacity (in units of Ah) and capacity versus cycle, respectively. These figures illustrate the performance of a large-format device (25 Ah) made with composite activated carbon/$NaTi_2(PO_4)_3$ anode and a $\lambda$-$MnO_2$ cathode. The device is very stable over many charge/discharge cycles.

If the activated carbon is not mixed with $NaTi_2(PO_4)_3$ material, it has been found to be less stable as a functional material. Without being limited to a particular theory, the present inventors believe that hydrogen is evolved at extreme states of charge, such as at an overcharge condition, and that the activated carbon mixed with $NaTi_2(PO_4)_3$ serves several purposes during use, including protecting $NaTi_2(PO_4)_3$ from corrosion by gettering hydrogen species (e.g., groups) that evolve during charging, and also providing a stable material during overcharge conditions described elsewhere herein (e.g., at a voltage above 1.6 V). Thus, it is believed that hydrogen species (e.g., protons or other hydrogen species) are stored pseudocapacitively at the composite anode electrode, while the alkali ions (e.g., Na or Na+Li) are stored by intercalation or a combination of intercalation and pseudocapacitive mechanisms in and/or at the anode electrode. For example, during electrochemical use, it is believed that the alkali ion intercalates and deintercalates in/out of the $NaTi_2(PO_4)_3$ through a potential range of −1 and −1.5 V vs. a standard mercury/mercury sulfate reference electrode. The activated carbon may also perform a charge storage function throughout the range of use via electrochemical double layer capacitance (EDLC) and/or pseudocapacitance.

Figure 9:
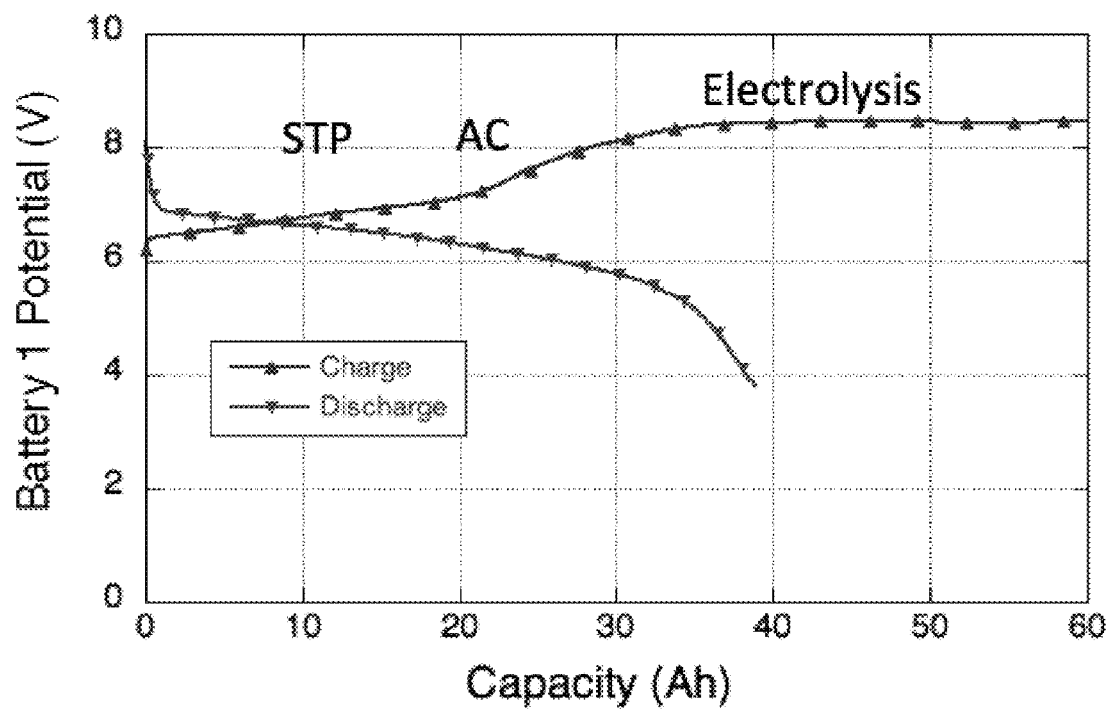
FIG. 9 is a plot of the voltage profile (i.e., voltage versus capacity in units of Ah) of a string of four large format cells made with composite activated carbon/$NaTi_2(PO_4)_3$ anode and a $\lambda\text{-}MnO_2$ cathode under severe overcharge testing where the performance of the activated carbon material is evident and labeled.

FIG. 9 shows the severe overcharging of a string of 4 of these devices connected in series, with the $NaTi_2(PO_4)_3$ reaction voltages, activated carbon (AC) voltage region, and the electrolysis/storage voltage range also shown. The subsequent discharge of string of cells showed higher than usual capacity (without this excessive charge, the normal capacity is about 30 Ah). This severe over charge did not damage the function of the battery and it is believed that some energy was stored via the capture and subsequent recombination of hydrogen species.

FIGS. 10A and 10B are respective plots of capacity versus cycle number and voltage versus capacity showing the long term stability of a 28 cell stack string similar to that shown in FIG. 4 made with composite activated carbon/$NaTi_2(PO_4)_3$ anode and a $\lambda$-$MnO_2$ cathode. No substantial capacity fade is observed over 145 cycles.

Figure 11A:
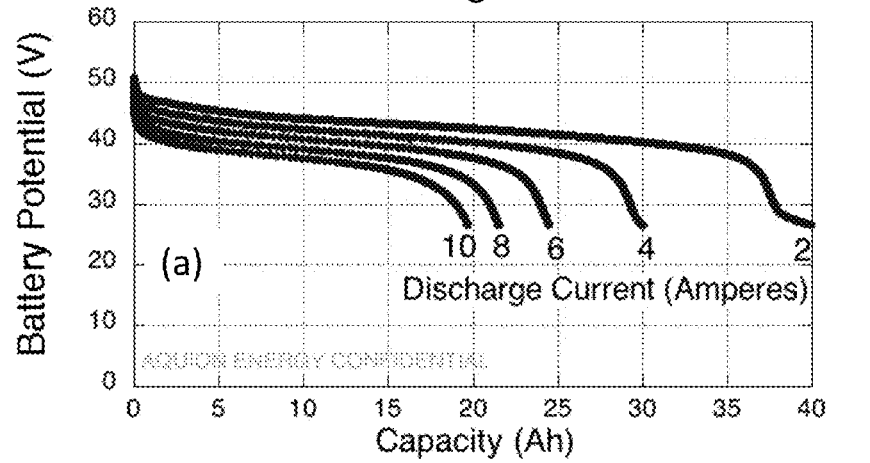
FIGS. 11A, 11B, and 11C are respective plots of voltage versus capacity, voltage versus energy and capacity versus cycle number, showing the embodied capacity (FIG. 11A), energy (FIG. 11B), and long term deep cycle life stability (FIG. 11C) of a device that contains 28 prismatic/parallel cell stacks connected electrically in series with no cell level battery management.
Figure 11B:
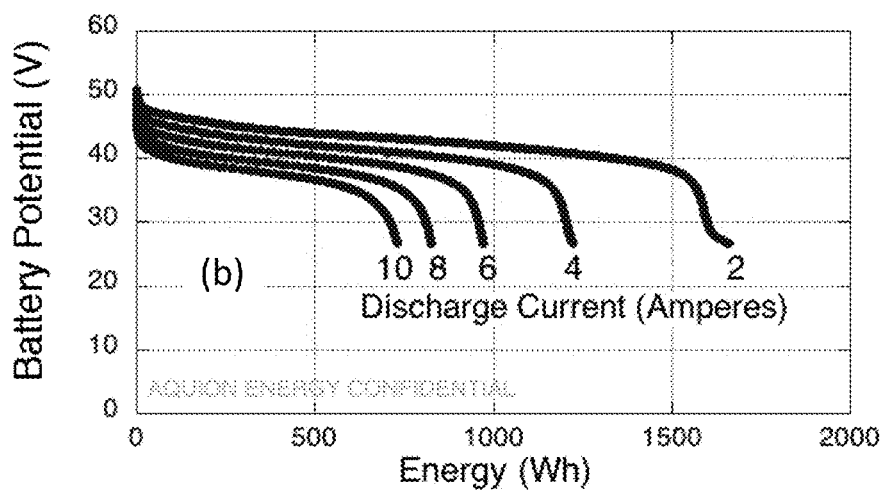
Figure 11C:
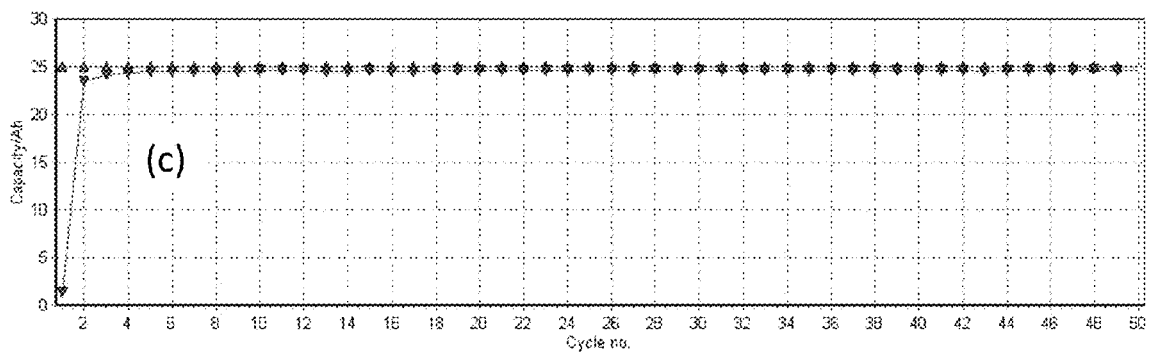

FIGS. 11A, 11B, and 11C are respective plots of voltage versus capacity, voltage versus energy and capacity versus cycle number. These figures illustrates the embodied capacity (FIG. 11A), energy (FIG. 11B), and long term deep cycle life stability (FIG. 11C) of a device that contains 28 prismatic/parallel cell stack similar to that shown in FIG. 4 and connected electrically in series with no cell level battery management. No substantial capacity fade is observed over 50 cycles.

Figures 12A, 12B:
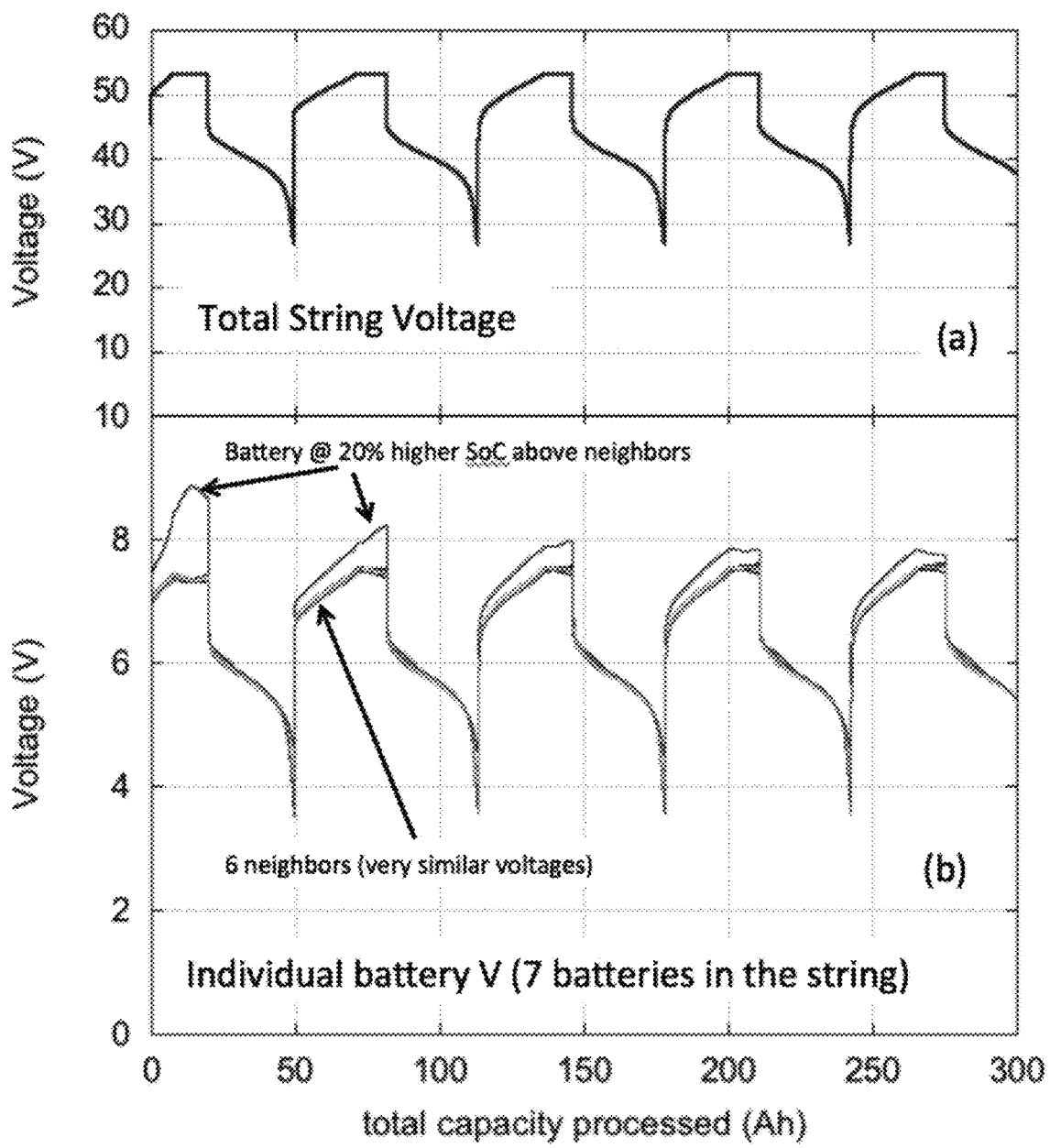
FIGS. 12A and 12B are plots of voltage versus total capacity processed for a string of a device having 7 series connected storage devices of 4 cells each, showing evidence of the suggested self-balancing mechanism that occurs as a result of having the activated carbon material composited with the $NaTi_2(PO_4)_3$ material in the anode.

FIGS. 12A and 12B are plots of voltage versus total capacity processed for a string of 28 cell stacks having seven series connected storage devices 102 of four cells stacks each, similar to that shown in FIG. 4. These figures show evidence of the suggested self-balancing mechanism that occurs as a result of having the activated carbon material composited with the $NaTi_2(PO_4)_3$ material in the anode. The cathode electrode of each cell was made from $\lambda$-$MnO_2$ and the anode electrode was made from a blend of activated carbon and $NaTi_2(PO_4)_3$. These cells are designed for 0.9 to 1.8V/cell operation. The anode electrode charge storage capacity is 90% of the capacity of the cathode electrode.

FIG. 12B shows the behavior of the individual units 102 (i.e., individual 4 cell stack devices) in the string, where the one of the seven units (top line) was intentionally overcharged. In this case, one of the units was intentionally taken to an initially 20% higher state of charge than the others and then the entire string was charged and discharged. The overcharged unit initially exhibits much higher voltage values than the other 6 units. However, with increasing total capacity processed, this unit converges to the highest stable voltage profile and stays there, as shown on the right of FIG. 12B, since no more self-balancing is needed to keep the string healthy. In other words, the voltage of the overcharged unit decreases with total capacity processed until is roughly approximates the voltage of the other six units in the string.

Figure 13:
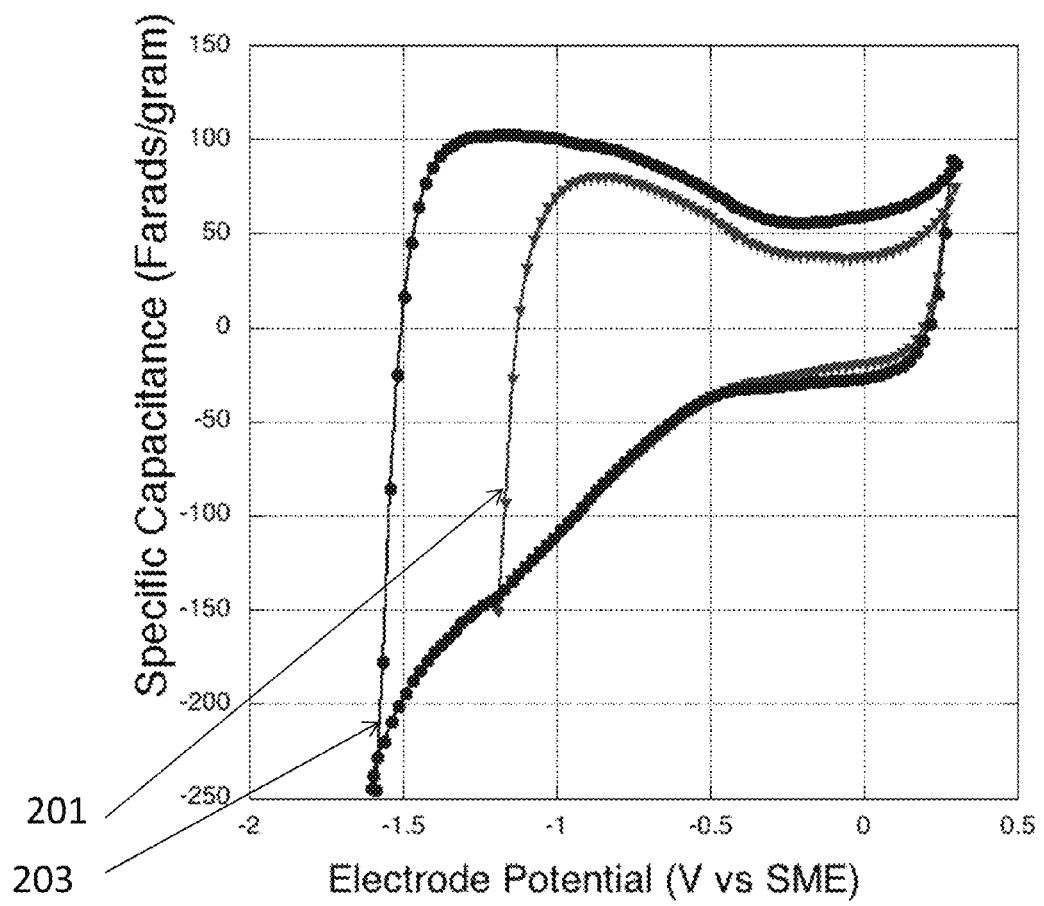
FIG. 13 is a cyclic voltammogram of activated carbon tested in a neutral pH aqueous solution of $Na_2SO_4$.

FIG. 13 is a cyclic voltammogram that shows the increase in storage capacitance (in Farads/g) as a result of generating local hydrogen, storing it, and then releasing it. Specifically, the figure illustrates a cyclic voltammogram of activated carbon tested in a neutral pH aqueous solution of $Na_2SO_4$ in which the potential range is such that hydrogen species and Off species are evolved and reversibly stored locally. By going to more extreme low anodic voltages (compared between lines 201 and 203), more energy is stored in the material.

Specifically, line 201 is a plot of activated carbon cycled to only −1.2 V vs. SME. This is a potential range where little to no hydrogen will be evolved, and the specific capacitance of plot 201 is lower than that for line 203 which shows the behavior of the carbon when it is taken to −1.6 V vs. SME. In this potential range, hydrogen is evolved and the specific capacitance of the material is increased from a maximum of about 80 F/g to a maximum of over 100 F/g (on the positive or cathodic sweep). The added capacitance is attributed to the storage and subsequent consumption of hydrogen that is generated at the electrode under more extreme potentials. In this non-limiting example, the anode active material is activated carbon, then electrolyte is 1 M aqueous $Na_2SO_4$, the sweep rate is 5 mV/second, and the reference electrode is $Hg/Hg_2SO_4$ in sulfuric acid.

Thus, it is believed that FIG. 13 illustrates that the stored hydrogen mechanism functions in the same environment created in the hybrid device within the activated carbon of the anode electrodes, such as during the above described overcharge condition. Furthermore, the anode stored hydrogen mechanism is more pronounced for long charge/discharge cycles (e.g., >1 hour cycles, such as 2-12 hour cycle). In contrast, this mechanism may not be observed in the quick "supercapacitor" type cycles (e.g., a few seconds to a few minutes) of prior art hybrid devices, such as the 200-920 second cycles of the Wang et al. article mentioned above.

Figure 14:
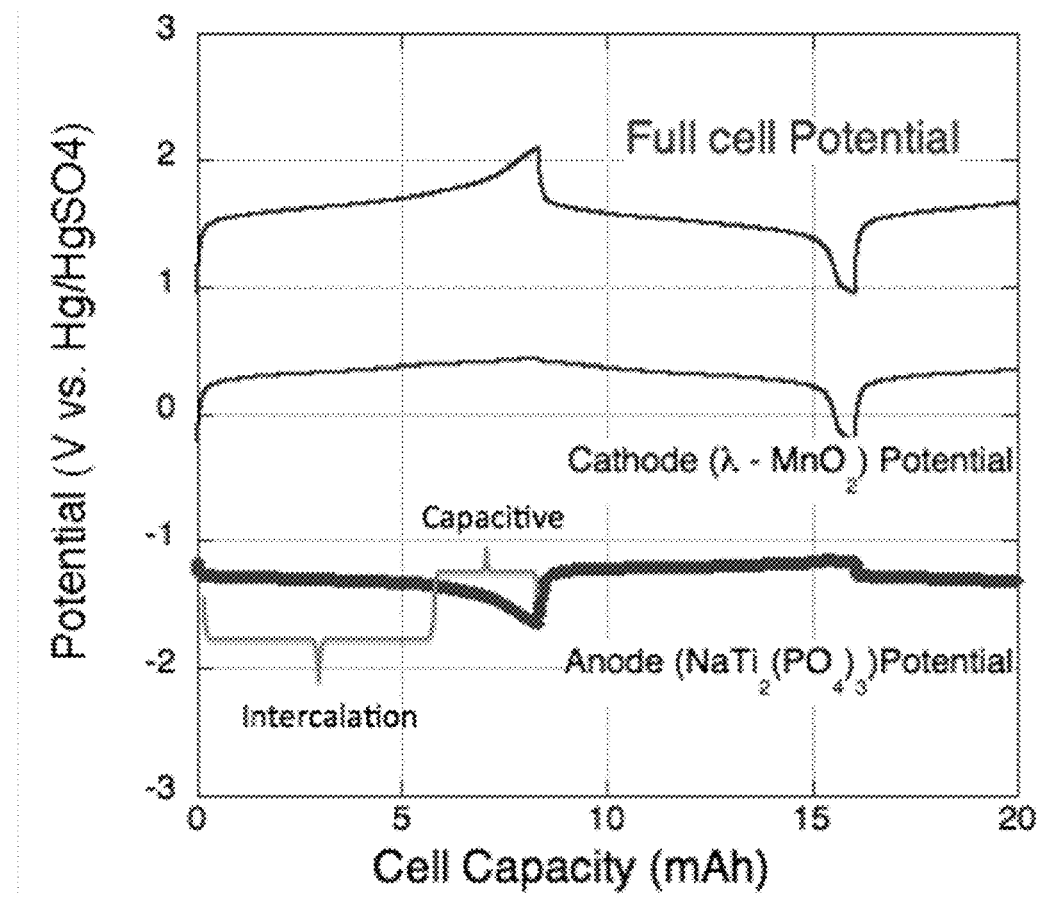
FIG. 14 is a plot of potential versus cell capacity illustrating three-electrode data from a cell with a $\lambda$-$MnO_2$ cathode structure and a composite anode containing activated carbon and $NaTi_2(PO_4)_3$.

FIG. 14 is a three electrode data set from a cell with a $\lambda$-$MnO_2$ cathode structure and a composite anode containing activated carbon and $NaTi_2(PO_4)_3$. The figure shows the voltages of the anode and cathode with respect to a reference electrode (and the full cell potential, which is the cathode voltage minus the anode voltage). The data show what voltage ranges in which the different electrodes work. At the highest state of charge just above 15 mAh, the anode potential decreases. This is believed to be the start of water electrolysis and hydrogen storage.

In summary, performance of the composite anode shows a specific capacity greater than 70 mAh/g in a relevant voltage range and excellent stability during use. This is much in contrast to the performance of the pure of $NaTi_2(PO_4)_3$ material, which has been shown to degrade significantly over even tens of lower rate, long duration deep discharges in similar electrolyte environments. It is believed that the presence of the activated carbon local to the $NaTi_2(PO_4)_3$ materials absorbs species that otherwise might contribute to the corrosion and loss of function of the material during electrochemical use.

In general, the anode may comprise any combination of materials capable of reversibly storing Na-ions (and/or other alkali or alkali earth ions) through an intercalation reaction (or phase change reaction) and surface adsorption/desorption (via an electrochemical double layer reaction and/or a pseudocapacitive reaction (i.e. partial charge transfer surface interaction)) and be corrosion/hydrogen resistant in the desired voltage range.

In an embodiment, the anodes are made of activated carbon (which is corrosion free; that is, not damaged by evolved hydrogen). Thus, the composite negative anode electrode contains a blend of a negative electrode active material that can insert and extract (i.e., intercalate and deintercalate sodium and/or lithium), and a high surface area, low electrical conductivity activated carbon that performs the energy storage function via electrochemical double layer capacitance and/or pseudocapacitance while also having the ability to store hydrogen species upon overcharge without loss in function (e.g., without substantial loss or fade in capacity over at least 100 cycles, such as 100-650 cycles).

Preferably, the capacitive/pseudocapacitive material of the composite anode comprises activated carbon having a surface area of 400-3000 $m^2/g$, such as 400-1500 $m^2/g$, preferably 600-1500 $m^2/g$, as determined by the BET method. Preferably the activated carbon has a high electrical resistivity, such as greater than 0.001 ohm-cm, e.g. 0.003 ohm-cm to 0.1 ohm-cm. Thus, the activated carbon has an electrical resistivity that is preferably at least two times greater than that of graphite (e.g., 0.0003 to 0.0008 ohm-cm) or other similar electrically conductive carbon materials which are added conductivity enhancers to prior art electrodes.

The activated carbon is preferably modified to have a specific capacitance more than 120 F/g (e.g., 120 to 180 F/g) in 1 M $Na_2SO_4$ under anodic biasing conditions. Preferably, the activated carbon is pseudocapacitive and is configured to operate in a voltage range of −1 to 0.8 volts SHE. Preferably, the intercalation material within the anode has over 80 mAh/g of capacity in the voltage range of interest for anode function.

Alternative anode materials include graphite, mesoporous carbon, carbon nanotubes, disordered carbon, Ti-oxide (such as titania) materials, V-oxide materials, phospho-olivine materials, other suitable mesoporous ceramic materials, other NASICON structure materials and combinations thereof.

Optionally, the composite anode electrode includes additional materials, such as a high surface area conductive diluent (such as conducting grade graphite, carbon blacks, such as acetylene black, non-reactive metals, and/or conductive polymers), a binder, such as PTFE, a PVC-based composite (including a PVC-$SiO_2$ composite), cellulose-based materials, PVDF, acrylic, other non-reactive non-corroding polymer materials, or a combination thereof, plasticizer, and/or a filler.

Optionally, additional hydrogen storage material may be added to the composite anode material to increase the amount of anode stored hydrogen. Non-limiting examples of additional hydrogen storage materials (besides the activated carbon or other capacitive/pseudocapacitive material) include materials which chemically and/or physically store hydrogen, such as metal hydride materials (e.g., $MgH_2$, $NaAlH_4$, $LiAlH_4$, LiH, $LaNi_5H_6$, $TiFeH_2$, palladium hydride, etc.), metal hydroxide materials, (e.g., nickel hydroxide), metal boro-hydrides (e.g., $LiBH_4$, $NaBH_4$, etc.), nanostructured carbon (e.g., carbon nanotubes, buckyballs, buckypaper, carbon nanohorns, etc.), hollow glass microspheres, etc. The hydrogen storage material may be added only to the surface of the active anode material, and/or it may be added to the bulk of the anode by being mixed and pressed with the active material. The hydrogen storage material may be added to the anode electrode in a range of at least 0.1 mass %, such as 0.5 to 10 mass %, for example 1-2 mass % of the anode.

Cathode

Any suitable material comprising a transition metal oxide, sulfide, phosphate, or fluoride can be used as active cathode materials capable of reversible alkali and/or alkali earth ion, such as Na-ion intercalation/deintercalation. Materials suitable for use as active cathode materials in embodiments of the present invention preferably contain alkali atoms, such as sodium, lithium, or both, prior to use as active cathode materials. It is not necessary for an active cathode material to contain Na and/or Li in the as-formed state (that is, prior to use in an energy storage device). However, for devices in which use a Na-based electrolyte, Na cations from the electrolyte should be able to incorporate into the active cathode material by intercalation during operation of the energy storage device. Thus, materials that may be used as cathodes in embodiments of the present invention comprise materials that do not necessarily contain Na or other alkali in an as-formed state, but are capable of reversible intercalation/deintercalation of Na or other alkali-ions during discharging/charging cycles of the energy storage device without a large overpotential loss.

In embodiments where the active cathode material contains alkali-atoms (preferably Na or Li) prior to use, some or all of these atoms are deintercalated during the first cell charging cycle. Alkali cations from a sodium based electrolyte (overwhelmingly Na cations) are re-intercalated during cell discharge. This is different than nearly all of the hybrid capacitor systems that call out an intercalation electrode opposite activated carbon. In most systems, cations from the electrolyte are adsorbed onto the anode during a charging cycle. At the same time, the counter-anions, such as hydrogen ions, in the electrolyte intercalate into the active cathode material, thus preserving charge balance, but depleting ionic concentration, in the electrolyte solution. During discharge, cations are released from the anode and anions are released from the cathode, thus preserving charge balance, but increasing ionic concentration, in the electrolyte solution. This is a different operational mode from devices in embodiments of the present invention, where hydrogen ions or other anions are preferably not intercalated into the cathode active material. The examples below illustrate cathode compositions suitable for Na intercalation. However, cathodes suitable for Li, K or alkali earth intercalation may also be used.

Suitable active cathode materials may have the following general formula during use: $A_xM_yO_z$, where A is Na or a mixture of Na and one or more of Li, K, Be, Mg, and Ca, where x is within the range of 0 to 1, inclusive, before use and within the range of 0 to 10, inclusive, during use; M comprises any one or more transition metal, where y is within the range of 1 to 3, inclusive; preferably within the range of 1.5 and 2.5, inclusive; and O is oxygen, where z is within the range of 2 to 7, inclusive; preferably within the range of 3.5 to 4.5, inclusive.

In some active cathode materials with the general formula $A_xM_yO_z$, Na-ions reversibly intercalate/deintercalate during the discharge/charge cycle of the energy storage device. Thus, the quantity x in the active cathode material formula changes while the device is in use.

In some active cathode materials with the general formula $A_xM_yO_z$, A comprises at least 50 at % of at least one or more of Na, K, Be, Mg, or Ca, optionally in combination with Li; M comprises any one or more transition metal; O is oxygen; x ranges from 3.5 to 4.5 before use and from 1 to 10 during use; y ranges from 8.5 to 9.5 and z ranges from 17.5 to 18.5. In these embodiments, A preferably comprises at least 51 at % Na, such as at least 75 at % Na, and 0 to 49 at %, such as 0 to 25 at %, Li, K, Be, Mg, or Ca; M comprises one or more of Mn, Ti, Fe, Co, Ni, Cu, V, or Sc; x is about 4 before use and ranges from 0 to 10 during use; y is about 9; and z is about 18.

In some active cathode materials with the general formula $A_xM_yO_z$, A comprises Na or a mix of at least 80 atomic percent Na and one or more of Li, K, Be, Mg, and Ca. In these embodiments, x is preferably about 1 before use and ranges from 0 to about 1.5 during use. In some preferred active cathode materials, M comprises one or more of Mn, Ti, Fe, Co, Ni, Cu, and V, and may be doped (less than 20 at %, such as 0.1 to 10 at %; for example, 3 to 6 at %) with one or more of Al, Mg, Ga, In, Cu, Zn, and Ni.

General classes of suitable active cathode materials include (but are not limited to) the layered/orthorhombic $NaMO_2$ (birnessite), the cubic spinel based manganate (e.g., $MO_2$, such as $\lambda\text{-}MnO_2$ based material where M is Mn, e.g., $Li_xM_2O_4$ (where $1 \le x < 1.1$) before use and $Na_2Mn_2O_4$ in use), the $Na_2M_3O_7$ system, the $NaMPO_4$ system, the $NaM_2(PO_4)_3$ system, the $Na_2MPO_4F$ system, the tunnel-structured orthorhombic $NaM_9O_{18}$, or materials with the Prussian blue type crystal structure having a formula $KMFe(CN)_6$, where M in all formulas comprises at least one transition metal. Typical transition metals may be Mn or Fe (for cost and environmental reasons), although Co, Ni, Cr, V, Ti, Cu, Zr, Nb, W, Zn, Mo (among others), or combinations thereof, may be used to wholly or partially replace Mn, Fe, or a combination thereof. In embodiments of the present invention, Mn is a preferred transition metal.

However, in other embodiments, the material may lack Mn. For example, for materials having a Prussian blue type crystal structure, such as the Prussian blue hexacyanometallate crystal structure, M may be copper and the material may comprise copper hexacyanoferrate, $KMFe(CN)_6$. Other metal—hexacyanoferrate materials may also be used, where the M is one or more of some combination of Cu, Ni, Fe, Ti, Mn, or other transition metals, such as Zn and/or Co. Examples of these materials are described in C. Wessells et al., Nature Communications 2, article number 550, published Nov. 22, 2011 (doi:10.1038/ncomms1563) and Y. Lu et al., Chem. Commun., 2012, 48, 6544-6546, both of which are incorporated herein by reference in their entirety.

In some embodiments, cathode electrodes may comprise multiple active cathode materials, either in a homogenous or near homogenous mixture or layered within the cathode electrode.

In some embodiments, the initial active cathode material comprises $NaMnO_2$ (bimassite structure) optionally doped with one or more metals, such as Li or Al.

In some embodiments, the initial active cathode material comprises $\lambda\text{-}MnO_2$ (i.e., the cubic isomorph of manganese oxide) based material, optionally doped with one or more metals, such as Li or Al.

In these embodiments, cubic spinel $\lambda\text{-}MnO_2$ may be formed by first forming a lithium containing manganese oxide, such as lithium manganate (e.g., cubic spinel $LiMn_2O_4$) or non-stoichiometric variants thereof. In embodiments which utilize a cubic spinel $\lambda\text{-}MnO_2$ active cathode material, most or all of the Li may be extracted electrochemically or chemically from the cubic spinel $LiMn_2O_4$ to form cubic spinel $\lambda\text{-}MnO_2$ type material (i.e., material which has a 1:2 Mn to O ratio, and/or in which the Mn may be substituted by another metal, and/or which also contains an alkali metal, and/or in which the Mn to O ratio is not exactly 1:2). This extraction may take place as part of the initial device charging cycle. In such instances, Li-ions are deintercalated from the as-formed cubic spinel $LiMn_2O_4$ during the first charging cycle. Upon discharge, Na-ions from the electrolyte intercalate into the cubic spinel $\lambda\text{-}MnO_2$. As such, the formula for the active cathode material during operation is $Na_yLi_xMn_2O_4$ (optionally doped with one or more additional metal as described above, preferably Al), with $0<x<1$, $0<y<1$, and $x+y \le 1.1$. Preferably, the quantity $x+y$ changes through the charge/discharge cycle from about 0 (fully charged) to about 1 (fully discharged). However, values above 1 during full discharge may be used. Furthermore, any other suitable formation method may be used. Non-stoichiometric $Li_xMn_2O_4$ materials with more than 1 Li for every 2 Mn and 40 atoms may be used as initial materials from which cubic spinel $MnO_2$ may be formed (where $1 \leq x < 1.1$ for example). Thus, the cubic spinel λ-manganate may have a formula $Al_zLi_xMn_{2-z}O_4$ where $1 \leq x < 1.1$ and $0 \leq z < 0.1$ before use, and $Al_zLi_xNa_yMn_2O_4$ where $0 \leq x < 1.1$, $0 \leq x < 1$, $0 \leq x+y < 1.1$, and $0 \leq z < 0.1$ in use (and where Al may be substituted by another dopant).

In some embodiments, the initial cathode material comprises $Na_2Mn_3O_7$, optionally doped with one or more metals, such as Li or Al.

In some embodiments, the initial cathode material comprises $Na_2FePO_4F$, optionally doped with one or more metals, such as Li or Al.

In some embodiments, the cathode material comprises orthorhombic $NaM_9O_{18}$, optionally doped with one or more metals, such as Li or Al. This active cathode material may be made by thoroughly mixing $Na_2CO_3$ and $Mn_2O_3$ to proper molar ratios and firing, for example at about 800° C. The degree of Na content incorporated into this material during firing determines the oxidation state of the Mn and how it bonds with $O_2$ locally. This material has been demonstrated to cycle between $0.33 < x < 0.66$ for $Na_xMnO_2$ in a non-aqueous electrolyte.

In another embodiment, the cathode material comprises cubic spinel $LiMn_2O_4$ and the electrolyte comprises $Li_2SO_4$, a blend of $Li_2SO_4$ and $Na_2SO_4$, or $Na_2SO_4$ only, and the anode comprises a composite of activated carbon and $NaTi_2(PO_4)_3$. In this case, a true mixed ion system is possible where either the anode and/or the cathode may intercalate/deintercalate both Li and/or Na ions during the normal course of use. This particular embodiment is thought to be a particularly low cost solution on a price/energy basis when considering the cost of the materials in the electrodes and the energy they embody.

Optionally, the cathode electrode may be in the form of a composite cathode comprising one or more active cathode materials, a high surface area conductive diluent (such as conducting grade graphite, carbon blacks, such as acetylene black, non-reactive metals, and/or conductive polymers), a binder, a plasticizer, and/or a filler. Exemplary binders may comprise polytetrafluoroethylene (PTFE), a polyvinylchloride (PVC)-based composite (including a PVC-$SiO_2$ composite), cellulose-based materials, polyvinylidene fluoride (PVDF), hydrated birnassite (when the active cathode material comprises another material), other non-reactive non-corroding polymer materials, or a combination thereof. A composite cathode may be formed by mixing a portion of one or more preferred active cathode materials with a conductive diluent, and/or a polymeric binder, and pressing the mixture into a pellet. In some embodiments, a composite cathode electrode may be formed from a mixture of about 50 to 90 wt % active cathode material, with the remainder of the mixture comprising a combination of one or more of diluent, binder, plasticizer, and/or filler. For example, in some embodiments, a composite cathode electrode may be formed from about 80 wt % active cathode material, about 10 to 15 wt % diluent, such as carbon black, and about 5 to 10 wt % binder, such as PTFE.

One or more additional functional materials may optionally be added to a composite cathode to increase capacity and replace the polymeric binder. These optional materials include but are not limited to Zn, Pb, hydrated $NaMnO_2$ (birnassite), and $Na_4Mn_9O_{18}$ (orthorhombic tunnel structure). In instances where hydrated $NaMnO_2$ (birnassite) and/ or hydrated $Na_{0.44}MnO_2$ (orthorhombic tunnel structure) is added to a composite cathode, the resulting device has a dual functional material composite cathode. A cathode electrode will generally have a thickness in the range of about 40 to 800 μm.

Current Collectors

In embodiments of the present invention, the cathode and anode materials may be mounted on current collectors. For optimal performance, current collectors are desirable that are electronically conductive and corrosion resistant in the electrolyte (aqueous Na-cation containing solutions, described below) at operational potentials.

For example, an anode current collector should be stable in a range of approximately −1.2 to −0.5 V vs. a standard $Hg/Hg_2SO_4$ reference electrode, since this is the nominal potential range that the anode half of the electrochemical cell is exposed during use. A cathode current collector should be stable in a range of approximately 0.1 to 0.7 V vs. a standard $Hg/Hg_2SO_4$ reference electrode.

Suitable uncoated current collector materials for the anode side include stainless steel, Ni, NiCr alloys, Al, Ti, Cu, Pb and Pb alloys, refractory metals, and noble metals. Alternatively, electrically conductive carbon, such as graphite, may be used.

Suitable uncoated current collector materials for the cathode side include stainless steel, Ni, NiCr alloys, Ti, Pb-oxides ($PbO_x$), and noble metals. Alternatively, electrically conductive carbon, such as graphite, may be used.

Current collectors may comprise solid foils, sheet or mesh materials. For example, graphite sheet current collectors 130 and 132 may be used, as shown in FIG. 2.

Another approach is to coat a metal foil current collector of a suitable metal, such as Al, with a thin passivation layer that will not corrode and will protect the foil onto which it is deposited. Such corrosion resistant layers may be, but are not limited to, TiN, CrN, C, CN, NiZr, NiCr, Mo, Ti, Ta, Pt, Pd, Zr, W, FeN, CoN, etc. These coated current collectors may be used for the anode and/or cathode sides of a cell. In one embodiment, the cathode current collector comprises Al foil coated with TiN, FeN, C, or CN. The coating may be accomplished by any method known in the art, such as but not limited to physical vapor deposition such as sputtering, chemical vapor deposition, electrodeposition, spray deposition, or lamination.

Electrolyte

Embodiments of the present invention provide a secondary (rechargeable) energy storage system which uses a water-based (aqueous) electrolyte, such as an alkali based (e.g., Li and/or Na-based) or alkaline earth based aqueous electrolyte. Use of Na allows for use of much thicker electrodes, much less expensive separator and current collector materials, and benign and more environmentally friendly materials for electrodes and electrolyte salts. Additionally, energy storage systems of embodiments of the present invention can be assembled in an open-air environment, resulting in a significantly lower cost of production.

Electrolytes useful in embodiments of the present invention comprise a salt dissolved fully in water. For example, the electrolyte may comprise a 0.1 M to 10 M solution of at least one anion selected from the group consisting of $SO_4^{2-}$, $NO_3^-$, $ClO_4^-$, $PO_4^{3-}$, $CO_3^{2-}$, $CH_3COO^-$, $Cl^-$, and/or $OH^-$. Thus, Na cation containing salts may include (but are not limited to) $Na_2SO_4$, $NaNO_3$, $NaClO_4$, $Na_3PO_4$, $Na_2CO_3$, NaCl, and NaOH, or a combination thereof.

In some embodiments, the electrolyte solution may be substantially free of Na. In these instances, cations in salts of the above listed anions may be an alkali other than Na (such as Li or K) or alkaline earth (such as Ca, or Mg) cation. Thus, alkali other than Na cation containing salts may include (but are not limited to) $Li_2SO_4$, $LiNO_3$, $LiClO_4$, $Li_3PO_4$, $Li_2CO_3$, LiCl, and LiOH, $K_2SO_4$, $KNO_3$, $KClO_4$, $K_3PO_4$, $K_2CO_3$, KCl, and KOH. Exemplary alkaline earth cation containing salts may include $CaSO_4$, $Ca(NO_3)_2$, $Ca(ClO_4)_2$, $CaCO_3$, and $Ca(OH)_2$, $MgSO_4$, $Mg(NO_3)_2$, $Mg(ClO_4)_2$, $MgCO_3$, and $Mg(OH)_2$. Electrolyte solutions substantially free of Na may be made from any combination of such salts. In this embodiment, the cathode electrode preferably comprises a doped or undoped cubic spinel $LiMn_2O_4$, the electrolyte preferably comprises at least one of $Li_2SO_4$, $LiClO_4$, $LiNO_3$, or $MnClO_4$ solvated in water, and the electrolyte is sodium free and contains no solvated sodium ions, but contains one or more of Li, K, Ca, Mn and Mg solvated cations.

In other embodiments, the electrolyte solution may comprise a solution of a Na cation containing salt and one or more non-Na cation containing salt. For example, as noted above, the electrolyte may comprise both sodium and lithium containing salts (e.g., lithium sulfate and sodium sulfate) solvated in water. In this embodiment, the cathode may comprise the cubic spinel λ-$MnO_2$ or $LiMn_2O_4$, and the anode may comprise a mixture of activated carbon and a mixed sodium and lithium containing NASICON material, such as $Li_{1-x}Na_x Ti_2(PO_4)_3$, where x varies from 0.05 to 0.95.

In one embodiment, it may also be advantageous to saturate the electrolyte with metallic species such that they may not be leached out of the active materials. For example, dissolving an excess of Mn ions in the electrolyte can combat the subsequent dissolution of Mn from the electrodes if they were to contain Mn. For example, the electrolyte may comprise $Na_2SO_4$ solvated in water and saturated with a $MnClO_4$ salt such that no Mn is able to be dissolved into the electrolyte from the Mn containing cathode (e.g., such as the spinel manganese oxide cathode) during the charging and discharging steps. Alternatively, the electrolyte may be completely saturated with one or more of $Na_2SO_4$, $Li_2SO_4$, $NaClO_4$, $LiClO_4$, $NaNO_3$, or $LiNO_3$ salts solvated in water such that no manganese ions dissolve into the electrolyte from the cathode during the steps of charging and discharging.

Molar concentrations preferably range from about 0.05 M to 3 M, such as about 0.1 to 1 M, at 100° C. for $Na_2SO_4$ in water depending on the desired performance characteristics of the energy storage device, and the degradation/performance limiting mechanisms associated with higher salt concentrations. Similar ranges are preferred for other salts.

A blend of different salts (such as a blend of a sodium containing salt with one or more of an alkali, alkaline earth, lanthanide, aluminum and zinc salt) may result in an optimized system. Such a blend may provide an electrolyte with sodium cations and one or more cations selected from the group consisting of alkali (such as Li or K), alkaline earth (such as Mg and Ca), lanthanide, aluminum, and zinc cations.

The pH of the electrolyte may be neutral (e.g., close to 7 at room temperature, such as 6.5 to 7.5). Optionally, the pH of the electrolyte may be altered by adding some additional OH-ionic species to make the electrolyte solution more basic, for example by adding NaOH other $OH^-$ containing salts, or by adding some other $OH^-$ concentration-affecting compound (such as $H_2SO_4$ to make the electrolyte solution more acidic). The pH of the electrolyte affects the range of voltage stability window (relative to a reference electrode) of the cell and also can have an effect on the stability and degradation of the active cathode material and may inhibit proton ($H^+$) intercalation, which may play a role in active cathode material capacity loss and cell degradation. In some cases, the pH can be increased to 11 to 13, thereby allowing different active cathode materials to be stable (than were stable at neutral pH 7). In some embodiments, the pH may be within the range of about 3 to 13, such as between about 3 and 6 or between about 8 and 13.

Optionally, the electrolyte solution contains an additive for mitigating degradation of the active cathode material, such as birnassite material. An exemplary additive may be, but is not limited to, $Na_2HPO_4$, in quantities sufficient to establish a concentration ranging from 0.1 mM to 100 mM.

Separator

A separator for use in embodiments of the present invention may comprise a woven or non-woven cotton sheet, PVC (polyvinyl chloride), PE (polyethylene), glass fiber or any other suitable material.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method of operating the energy storage device comprising a plurality of electrically connected electrochemical energy storage cells, wherein each cell comprises a negative anode electrode comprising both an ion intercalation material and an electrochemical double layer capacitive and/or pseudocapacitive material, a positive cathode electrode, a separator, and an aqueous electrolyte, the method comprising charging and discharging the plurality of electrochemical energy storage cells, wherein the electrochemical double layer capacitive and/or pseudocapacitive material protects the ion intercalation material from corrosion by gettering hydrogen species that evolve during the charging step.

2. The method of claim 1, wherein:

on charging, water in the aqueous electrolyte electrolyzes to form hydrogen and $OH^-$ species at an anode electrode of at least one of the plurality of cells when a charge storage capacity of the anode electrode of the at least one cell is exceeded on charging the at least one cell, the $OH^-$ species increase a pH proximal to the anode electrode surface, and the increase in pH lowers a voltage stability window of the electrolyte, thereby reducing or eliminating further hydrogen evolution; and on discharging, the hydrogen species formed on charging of the at least one cell combines with the $OH^-$ species.

3. The method of claim 2, wherein the steps of charging and discharging have a cycle time of greater than 1 hour, and wherein the step of charging comprises charging the storage device at a voltage 1.5 times greater or 0.8 volts higher than a voltage at which electrolysis of the water at the anode electrode is initiated under pH 7 conditions.

4. The method of claim 2, wherein the double layer capacitive and/or pseudocapacitive material comprises an activated carbon, the intercalation material comprises $NaTi_2(PO_4)_3$, and the activated carbon material protects the $NaTi_2(PO_4)_3$ material from the corrosion by gettering the hydrogen species that evolve during the charging step.

5. The method of claim 4, wherein during the steps of charging and discharging the $NaTi_2(PO_4)_3$ material reversibly intercalates and deintercalates alkali metal cations from the electrolyte and the activated carbon material undergoes a partial non-Faradaic charge transfer surface interaction with the alkali metal cations while also having an ability to store hydrogen species upon overcharge without substantial decrease in capacity over at least 100 cycles.

6. The method of claim 1, further comprising maintaining the plurality of electrochemical energy storage cells at temperatures ranging from 30 to 90° C. during the steps of charging and discharging.

7. The method of claim 1, wherein the electrolyte is saturated with one or more of $Na_2SO_4$, $Li_2SO_4$, $NaClO_4$, $LiCO_4$, $NaNO_3$, $LiNO_3$ and $MnClO_4$ salts solvated in water such that no manganese ions dissolve into the electrolyte from the cathode during the steps of charging and discharging.

8. The method of claim 1, wherein:
the intercalation material comprises a NASICON material having a formula $Na_xLi_{(1-x)}Ti_2(PO_4)_3$, where $0.05 \leq x \leq 1$;
the double layer capacitive and/or pseudocapacitive material comprises an activated carbon having a surface area between 400 and 1500 $m^2/g$; and
during the charging step, the NASICON material intercalates at least one of Li, Na and K alkali cations from the electrolyte regardless of which alkali species is resident in the NASICON material depending on alkali cation availability in the electrolyte and intercalation affinity, such that one or more of Li, Na and K intercalate and reside in the host NASICON material structure to form a fully charged intercalation material that has a formula $A_2Li_xNa_{(1-x)}Ti_2(PO_4)_3$, where A is one or more of Li, Na and K.

9. The method of claim 1, wherein the anode electrode comprises a composite of the ion intercalation material and the electrochemical double layer capacitive and/or pseudocapacitive material.

10. The method of claim 9, wherein the composite is formed by blending $NaTi_2(PO_4)_3$ and activated carbon.

11. The method of claim 10, wherein the blend ranges from 0.5:9 to 9.5:0.5 mass ratio of $NaTi_2(PO_4)_3$:activated carbon.

12. The method of claim 11, wherein the blend ranges from 1:9 to 9:1 mass ratio of $NaTi_2(PO_4)_3$:activated carbon.

13. The method of claim 12, wherein the blend ranges from 1:4 to 4:1 mass ratio of $NaTi_2(PO_4)_3$:activated carbon.

14. The method of claim 13, wherein the blend ranges from 2:3 to 3:2 mass ratio of $NaTi_2(PO_4)_3$:activated carbon.

15. The method of claim 14, wherein the blend contains an about 1:1 mass ratio of $NaTi_2(PO_4)_3$:activated carbon.

16. The method of claim 1, wherein at least a portion of the plurality of electrochemical storage cells comprise anode limited electrochemical storage cells.

17. The method of claim 1, further comprising overcharging at least one of the plurality of electrochemical storage cells during a charging step.

18. The method of claim 5, wherein the $NaTi_2(PO_4)_3$ material in the negative anode electrode reversibly intercalates and deintercalates sodium cations from the electrolyte which comprises a $Na_2SO_4$ aqueous electrolyte.

19. The method of claim 18, wherein the anode electrode comprises a solid free standing anode electrode on a current collector and the anode electrode comprises a porous crystalline structure that is filled with the electrolyte.

20. The method of claim 1, wherein the anode electrode comprises a solid composite of the ion intercalation material and the electrochemical double layer capacitive and/or pseudocapacitive material having a porous crystalline structure that is filled with the electrolyte.

* * * * *